(12) United States Patent
Wen et al.

(10) Patent No.: US 11,854,571 B2
(45) Date of Patent: Dec. 26, 2023

(54) METHOD, DEVICE AND ELECTRONIC APPARATUS FOR TRANSMITTING AND RECEIVING SPEECH SIGNAL

(71) Applicant: SAMSUNG ELECTRONICS CO., LTD., Suwon-si (KR)

(72) Inventors: Liang Wen, Beijing (CN); Lizhong Wang, Beijing (CN); Anxi Yi, Beijing (CN); Chao Min, Beijing (CN); Liangxi Yao, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 169 days.

(21) Appl. No.: 17/105,729

(22) Filed: Nov. 27, 2020

(65) Prior Publication Data
US 2021/0166717 A1 Jun. 3, 2021

(30) Foreign Application Priority Data

Nov. 29, 2019 (CN) .......................... 201911196782.X

(51) Int. Cl.
*G10L 25/18* (2013.01)
*G10L 25/30* (2013.01)
*G10L 25/90* (2013.01)

(52) U.S. Cl.
CPC .............. *G10L 25/18* (2013.01); *G10L 25/30* (2013.01); *G10L 25/90* (2013.01)

(58) Field of Classification Search
CPC .......... G10L 25/18; G10L 25/30; G10L 25/90
(Continued)

(56) References Cited

U.S. PATENT DOCUMENTS

2006/0247922 A1 11/2006 Hetherington et al.
2011/0137644 A1 6/2011 Nilsson et al.
(Continued)

FOREIGN PATENT DOCUMENTS

CN 107277207 A 10/2017
JP 5046233 B2 10/2012
(Continued)

OTHER PUBLICATIONS

Wu et al., "Quasi-Periodic WaveNet Vocoder: A Pitch Dependent Dilated Convolution Model for Parametric Speech Generation", Proc. Interspeech, Jul. 2019. (Year: 2019).*
(Continued)

*Primary Examiner* — Paras D Shah
*Assistant Examiner* — Nicole A K Schmieder
(74) *Attorney, Agent, or Firm* — Sughrue Mion, PLLC

(57) ABSTRACT

Apparatuses and methods of transmitting and receiving a speech signal. The method of transmitting a speech signal includes extracting low frequency feature information from an input speech signal by using a first feature extracting network; and transmitting a speech signal corresponding to the low frequency feature information to a receiving end. The method of receiving a speech signal includes receiving a first speech signal transmitted by a transmitting end; extracting low frequency feature information from the first speech signal and recovering high frequency feature information based on the low frequency feature information, by using a second feature extracting network; and outputting a second speech signal including the low frequency feature information and the high frequency feature information.

16 Claims, 18 Drawing Sheets

(58) Field of Classification Search
USPC .......................................................... 704/202
See application file for complete search history.

(56) References Cited

U.S. PATENT DOCUMENTS

| | | |
|---|---|---|
| 2012/0065967 A1 | 3/2012 | Ohkawa |
| 2013/0085751 A1* | 4/2013 | Takahashi ............. G10L 19/018 |
| | | 704/226 |
| 2013/0132099 A1 | 5/2013 | Oshikiri et al. |
| 2018/0358003 A1 | 12/2018 | Calle et al. |
| 2019/0259409 A1 | 8/2019 | Variani et al. |
| 2021/0375294 A1* | 12/2021 | Gu ...................... G10L 21/0308 |

FOREIGN PATENT DOCUMENTS

| | | |
|---|---|---|
| KR | 1020120071866 A | 7/2012 |
| KR | 10-1699252 B1 | 1/2017 |
| KR | 10-2019-0001278 A | 1/2019 |

OTHER PUBLICATIONS

International Search Report (PCT/ISA/210) and Written Opinion (PCT/ISA/237) dated Mar. 2, 2021 issued by the International Searching Authority in International Application No. PCT/KR2020/017111.
Volodymyr Kuleshov et al. "Audio Super-Resolution Using Neural Nets" Workshop track—ICLR, retrieved from arXiv:1708.00853v1 [cs.SD], Aug. 2, 2017 (8 pages total).
European Search Report, dated Nov. 25, 2022, issued by the European Patent Office, Application No. 20894168.2.

* cited by examiner

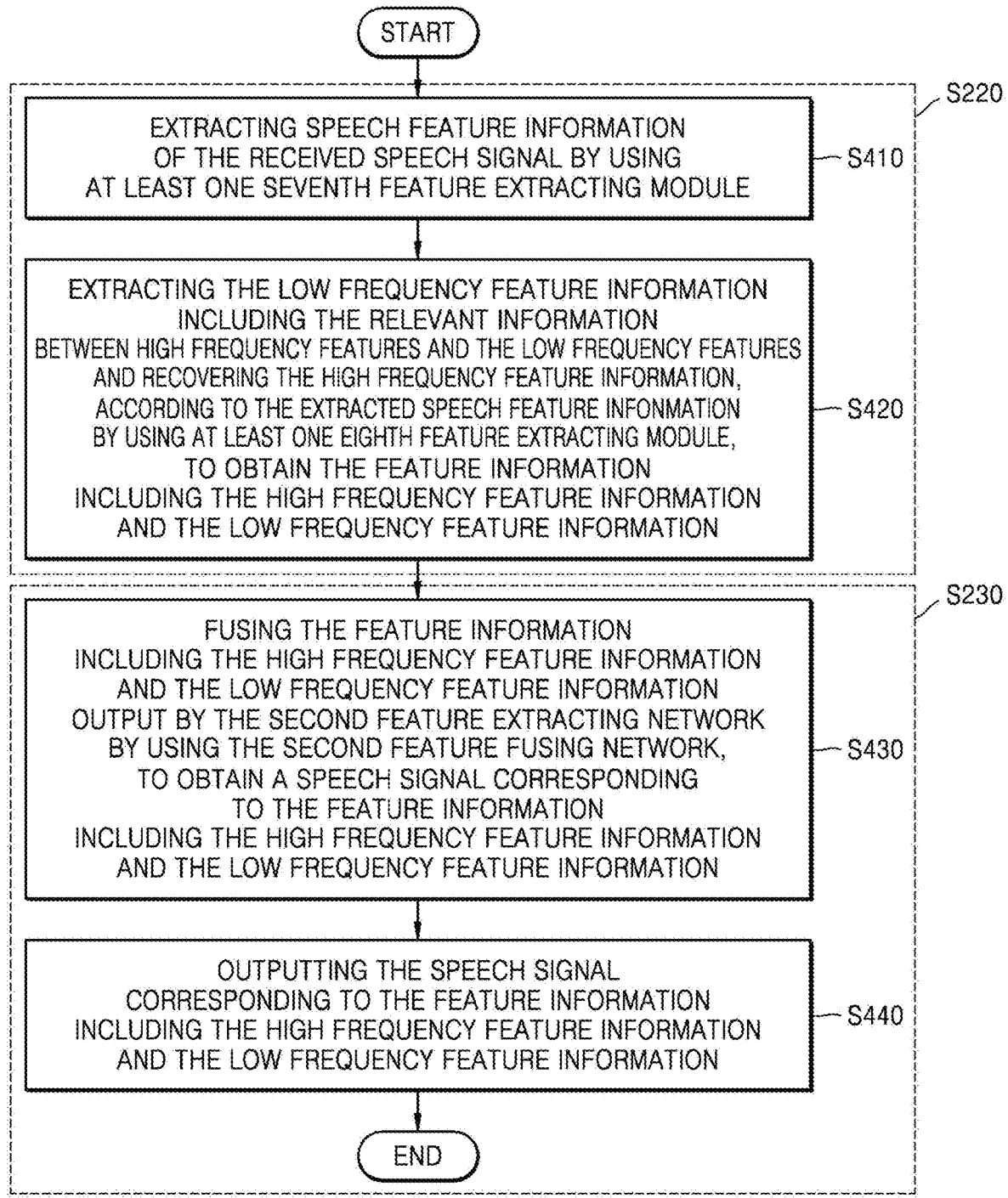

FIG. 10D
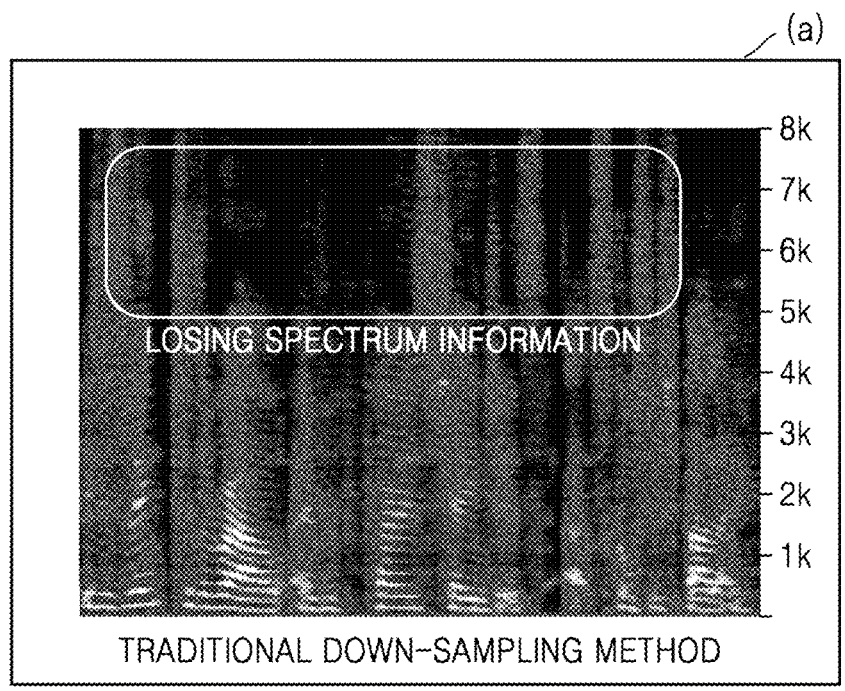
(a) TRADITIONAL DOWN-SAMPLING METHOD
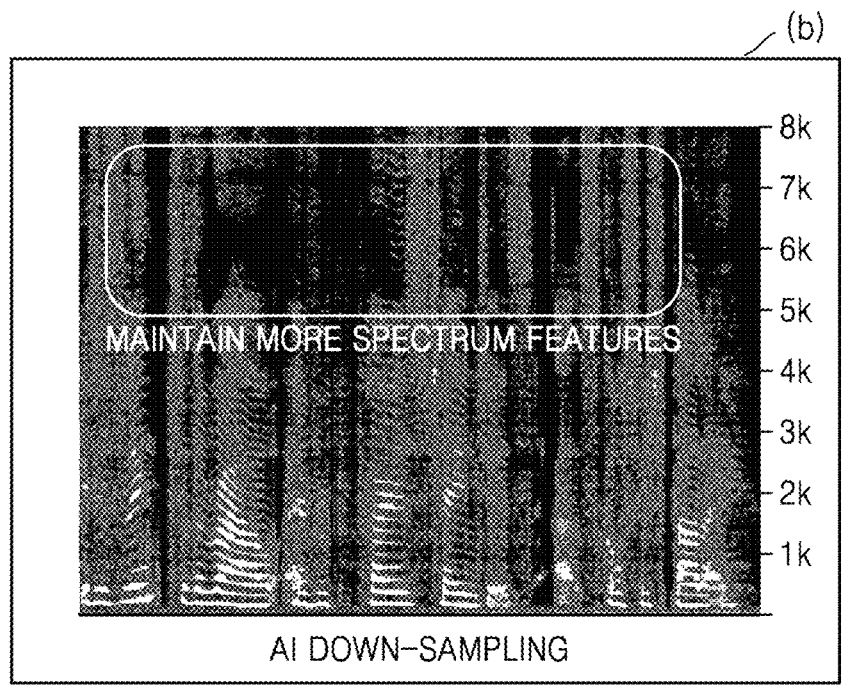
(b) AI DOWN-SAMPLING

# METHOD, DEVICE AND ELECTRONIC APPARATUS FOR TRANSMITTING AND RECEIVING SPEECH SIGNAL

CROSS-REFERENCE TO THE RELATED APPLICATION(S)

This application is based on and claims priority from Chinese Patent Application 201911196782.X, filed on Nov. 29, 2019, in the Chinese Patent Office, the disclosure of which is incorporated by reference herein in its entirety.

BACKGROUND

1. Field

The disclosure relates to a speech communication, and more particularly, to a method, an apparatus, an electronic device, and a computer readable storage medium for transmitting and receiving speech signal based on a neural network.

2. Description of Related Art

The current mobile communication networks (2G/3G/4G) only support speech sampling rates of a narrow band (NB)/a wide band (WB), however, the current mainstream terminal apparatuses are capable of supporting speech signal collection and recording under a super wide band (SWB). Thus, the current mobile communication networks do not allow the terminal apparatuses fully utilize their speech signal collection and recording functions implemented in the terminal apparatuses.

Since a person's speech has a comparatively broad range of speech bandwidths, and the bandwidths supported by the mobile communication networks are limited, in mobile communication, a transmitting end of a speech needs to down-sample the collected speech of a speaker to a sampling rate supported by a mobile communication network, then encode the down-sampled speech to be transmitted through the mobile communication network. At the same time, a receiving end must decode the received encoded speech signal and play the decoded speech signal directly on a receiver. However, in order to improve user experience, the receiving end may also expand the received signal into a higher bandwidth and sampling rate, so that the speech sound is more suitable to the listeners (or users of the receiver). Therefore, in the related art, the transmitting end and the receiving end of the speech perform sampling rate conversion on speech signals by using a down-sampling technology and a bandwidth expanding technology, respectively.

However, in the related art, the sampling rate conversion being performed when a terminal transmits and receives a speech signal degrades the quality of the speech signal, so it degrades the user experience in terms of receiving a high quality speech signal.

SUMMARY

Embodiments of the inventive concept provide a speech transmitting method and device and a speech receiving method and device based on a neural network.

Additional aspects will be set forth in part in the description which follows and, in part, will be apparent from the description, or may be learned by practice of the presented embodiments.

In accordance with an aspect of embodiments, there is provided a method of transmitting speech signal. The method includes extracting low frequency feature information from an input speech signal by using a first feature extracting network; and transmitting a speech signal corresponding to the low frequency feature information to a receiving end.

The first feature extracting network includes at least one first feature extracting module and at least one second feature extracting module, and the extracting the low frequency feature information from the input speech signal by using the first feature extracting network includes: extracting speech feature information of the input speech signal by using the at least one first feature extracting module; and obtaining the low frequency feature information according to the extracted speech feature information by using the at least one second feature extracting module.

The extracting the speech feature information of the input speech signal includes performing feature extraction on input information respectively based on at least two convolution processing parameters, and outputting the extracted feature information.

The at least two convolution processing parameters includes at least two of: a first convolution processing parameter corresponding to a first receptive field between adjacent samples of the speech signal, a second convolution processing parameter corresponding to a second receptive field of one pitch length, or a third convolution processing parameter corresponding to a third receptive field of at least two pitch lengths.

The convolution processing parameter includes a convolution kernel size corresponding to a convolution operation.

The transmitting the speech signal corresponding to the low frequency feature information to the receiving end includes: fusing one or more low frequency feature information output by the first feature extracting network by using a first feature fusing network, to obtain the speech signal corresponding to the low frequency feature information.

The low frequency feature information extracted by the first feature extracting network includes relevant information between high frequency features and low frequency features.

The obtaining the low frequency feature information according to the extracted speech feature information by using the at least one second feature extracting module includes down-sampling the extracted speech feature information at one or more scales.

In accordance with an aspect of embodiments, there is provided a method for receiving speech signal. The method includes: receiving a first speech signal transmitted by a transmitting end; extracting low frequency feature information from the first speech signal and recovering high frequency feature information based on the low frequency feature information, by using a second feature extracting network; and outputting a second speech signal including the low frequency feature information and the high frequency feature information.

The method further includes: performing data replication on the first speech signal to expand data scale of the first speech signal before the extracting the low frequency feature information from the first speech signal and recovering the high frequency feature information by using the second feature extracting network.

The extracting the low frequency feature information from the first speech signal and recovering the high frequency feature information by using the second feature extracting network includes: extracting the low frequency feature information from the first speech signal by using a low frequency feature extracting network in the second feature extracting network, wherein the low frequency feature information includes relevant information between high frequency features and low frequency features; and recovering the high frequency feature information according to the low frequency feature information and performing fusing processing on the high frequency feature information and the low frequency feature information, by using a high frequency feature extracting network in the second feature extracting network, to obtain feature information including the high frequency feature information and the low frequency feature information.

The low frequency feature extracting network includes at least one third feature extracting module and at least one fourth feature extracting module, and the extracting the low frequency feature information from the first speech signal by using the low frequency feature extracting network in the second feature extracting network includes: extracting speech feature information of the first speech signal by using the at least one third feature extracting module; and obtaining the low frequency feature information according to the extracted speech feature information by using the at least one fourth feature extracting module. The high frequency feature extracting network includes at least one fifth feature extracting module and at least one sixth feature extracting module, and the recovering the high frequency feature information according to the low frequency feature information and performing the fusing processing on the high frequency feature information and the low frequency feature information includes: recovering the high frequency feature information according to the low frequency feature information by using the at least one fifth feature extracting module; and performing fusing processing on the high frequency feature information and the low frequency feature information extracted by a corresponding fourth feature extracting module, by using the at least one sixth feature extracting module, to obtain the feature information including the high frequency feature information and the low frequency feature information.

At least one of a plurality of feature extracting modules in the second feature extracting network performs feature extraction on input information respectively through at least two convolution processing parameters, and outputs the extracted feature information; and for the input high frequency feature information respectively corresponding to at least two convolution processing parameters, the at least one sixth feature extracting module respectively performs fusing processing on the high frequency feature information and the low frequency feature information, which is extracted by a corresponding fourth feature extracting module according to corresponding convolution processing parameters, and outputs the feature information including the high frequency feature information and the low frequency feature information.

The convolution processing parameter includes a convolution kernel size corresponding to a convolution operation.

The second feature extracting network includes at least one seventh feature extracting module and at least one eighth feature extracting module, and the extracting the low frequency feature information from the first speech signal and recovering the high frequency feature information by using the second feature extracting network includes: extracting speech feature information of the first speech signal by using the at least one seventh feature extracting module; and extracting the low frequency feature information including relevant information between high frequency features and low frequency features according to the extracted speech feature information and recovering the high frequency feature information, by using the at least one eighth feature extracting module, to obtain feature information including the high frequency feature information and the low frequency feature information.

The at least one seventh feature extracting module performs feature extraction on input information respectively through at least two convolution processing parameters, and outputs the extracted speech feature information; and the at least one eighth feature extracting module extracts the low frequency feature information from the input information respectively through at least two deconvolution processing parameters and recovers the high frequency feature information to obtain the feature information including the high frequency feature information and the low frequency feature information.

The outputting the second speech signal including the low frequency feature information and the high frequency feature information includes: fusing the feature information including the high frequency feature information and the low frequency feature information output by the second feature extracting network, by using a second feature fusing network, to obtain the second speech signal corresponding to the feature information including the high frequency feature information and the low frequency feature information.

In accordance with an aspect of embodiments, there is provided an apparatus for transmitting speech signal. The apparatus includes: a transceiver; at least one memory storing one or more instructions; and at least one processor executing the one or more instructions. The at least one processor is configured to: extract low frequency feature information from an input speech by using a first feature extracting network; and controlling the transceiver to transmit a speech signal corresponding to the low frequency feature information to a receiving end.

In accordance with an aspect of embodiments, there is provided a non-transitory computer-readable recording medium having recorded thereon computer programs for performing a method of transmitting a speech signal.

BRIEF DESCRIPTION OF THE DRAWINGS

The above and other aspects, features, and advantages of certain embodiments of will be more apparent from the following description taken in conjunction with the accompanying drawings, in which:

FIG. 9 is a flowchart illustrating the speech receiving method according to another exemplary embodiment;

FIG. 10D are diagrams illustrating a difference between a down-sampling method based on AI and a traditional down-sampling method;

DETAILED DESCRIPTION

Figure 1:
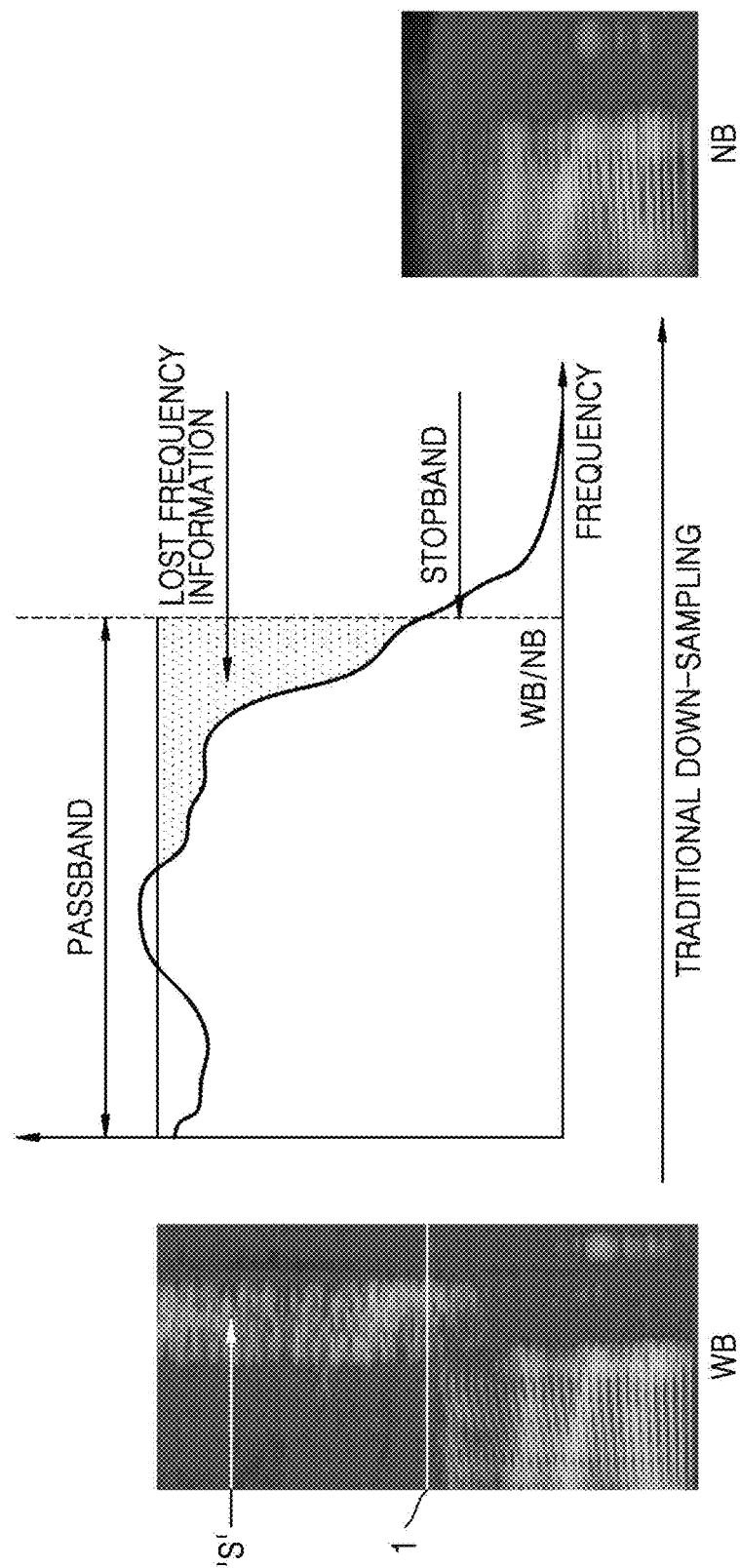
FIG. 1 is a diagram illustrating down-sampling a sampled SWB signal to a WB signal in a related art.

Embodiments of the present disclosure will be described and illustrated in the accompanying drawings in which the same reference numerals may refer to the same or similar elements, features, parts and structures. Hereafter, the embodiments will be explained with reference to the accompanying drawings to facilitate explanation on the present disclosure.

Various embodiments will now be described in greater detail below with reference to the accompanying drawings. However, the inventive concept may include various forms and should not be understood as being limited to embodiments set forth herein. Parts, elements, components or structures not related to a particular embodiment may be omitted for clarity.

The terms and words used in the following description and claims are not limited to the plain and ordinary meanings, but may include various meanings in the context of the disclosure to enable a clear and consistent understanding of the disclosure. Accordingly, it should be apparent to those skilled in the art that the following description of various embodiments is provided for illustration purpose only and not for the purpose of limiting the inventive concept as defined by the appended claims and their equivalents.

It is to be understood that the singular forms "a," "an," and "the" include plural referents unless the context clearly indicates otherwise. Thus, for example, reference to "a component surface" includes reference to one or more of such surfaces.

As used herein, the singular forms "a", "an" and "the" are intended to include the plural forms as well, unless the context clearly indicates otherwise. It should be understood that the terms "comprising," "including," and "having" are inclusive and therefore specify the presence of stated features, numbers, steps, operations, components, units, or their combination, but do not preclude the presence or addition of one or more other features, numbers, steps, operations, components, units, or their combination. In particular, numerals are to be understood as examples for the sake of clarity, and are not to be construed as limiting the embodiments by the numbers set forth.

Herein, the terms, such as "unit" or "module" should be understood as a unit in which at least one function or operation is processed and may be embodied as hardware, software, or a combination of hardware and software.

It should be understood that, although the terms "first," "second," etc. may be used herein to describe various elements, and these elements should not be limited by these terms. These terms may be used to distinguish one element from another. For example, a first element may be termed a second element within the technical scope of an embodiment.

Expressions, such as "at least one of," when preceding a list of elements, modify the entire list of elements and do not modify the individual elements of the list. For example, the expression "at least one of a, b or c" may include only a, only b, only c, both a and b, both a and c, both b and c, all of a, b, and c, and any variations thereof.

According to embodiments, functions related to artificial intelligence (AI) may operate via a processor and a memory. The processor may include one or more processors. The one or more processors may include a general-purpose processor such as a central processing unit (CPU), an application processor (AP), a digital signal processor (DSP), a dedicated graphics processor such as a graphical processing unit (GPU) or a vision processing unit (VPU), a dedicated AI processor such as a neural processing unit (NPU), or the like, but is not limited thereto. The one or more processors may control input data to be processed according to predefined operation rules or an AI model stored in the memory. When the one or more processors are a dedicated AI processor, the dedicated AI processor may be designed with a hardware structure specialized for processing a specific AI model.

The predefined operation rules or AI model may be created via a training process. The predefined operation rules or AI model may, for example, be set to perform desired characteristics (or purpose) created by training a basic AI model with a learning algorithm that utilizes a large number of training data. The training process may be performed by a device for performing AI or a separate server and/or system. Examples of the learning algorithm may include, without limitation, supervised learning, unsupervised learning, semi-supervised learning, and reinforcement learning, but embodiments are not limited thereto.

The AI model may include a plurality of neural network layers. Each of the neural network layers may have a plurality of weight values and may perform various neural network computations via arithmetic operations on results of calculations in a previous layer and a plurality of weight values in the current layer. A plurality of weights in each of the neural network layers may be optimized by a result of training the AI model. For example, a plurality of weights may be updated to reduce or minimize a loss or cost value acquired by the AI model during a training process. An artificial neural network may include, for example, and without limitation, a deep neural network (DNN) and may include, for example, and without limitation, a convolutional neural network (CNN), a DNN, a recurrent neural network (RNN), a restricted Boltzmann machine (RBM), a deep belief network (DBN), a bidirectional recurrent DNN (BRDNN), deep Q-networks (DQN), or the like, but is not limited thereto.

In the embodiments of the disclosure, a terminal to which the speech transmitting method or speech receiving method set forth herein may be applied includes, but are not limited to, terminal devices such as a mobile phone, a PAD and a smart watch etc. that may transmit or receive a speech. The terminal may transmit or receive a speech according to the method provided in the embodiments of the disclosure in a speech communication scene, for example, the terminal may, as a transmitting end in a speech communication, perform sampling rate conversion according to the speech transmitting method provided in the embodiments of the disclosure, and transmit a speech to a receiving end after encoding the same. The terminal may also serve as a receiving end in the speech communication to decode a stream corresponding to the received speech signal according to the speech transmitting method provided in the embodiments of the disclosure to obtain the speech signal, and play the speech signal for a user after performing the sampling rate conversion thereon. In addition, the methods proposed in the embodiments of the disclosure may also be applied to other scenes of speech transmission or reception, and the embodiments are not limited thereto.

In the embodiments of the disclosure, a sampling rate of an NB speech signal may be 8 kHz; a sampling rate of a WB speech signal may be 16 kHz; a sampling rate of an SWB speech signal may be 32 kHz. However, the sampling rates described above are not limited thereto, and may include any other sampling rates suitable to perform down-sampling or up-sampling.

A process of converting a speech signal from a comparatively low sampling rate into a comparatively high sampling rate may be referred to as up-sampling, and may also be referred to as bandwidth expansion, super resolution and scale up, for example, converting the speech signal from a WB signal to a SWB signal.

A process of converting a speech signal from a comparatively high sampling rate into a comparatively low sampling rate may be referred to as down-sampling, and may also be referred to as scale down, for example, converting the speech signal from a SWB signal to a WB signal, or from a SWB signal to a NB signal, or from a WB signal to a NB signal.

Currently, in down-sampling aspect of a speech signal down-sampling, a traditional signal processing method is generally adopted to down-sample the collected SWB signal to a WB or NB signal. However, ranges of a passband and stopband, and characteristics of a transition band are required to be designed in a filter-based down-sampling method. The uneven amplitudes of passband frequency characteristics and the attenuation of a low frequency signal by the transition band frequency characteristics cause that a low frequency portion of the finally obtained WB signal has a certain loss in comparison with a low frequency portion of the original SWB signal, and this kind of loss may reduce intelligibility of a voice.

FIG. 1 is a diagram illustrating down-sampling a sampled SWB signal to a WB signal in a related art.

As illustrated in FIG. 1, in the pronunciation of a voiceless sound in an utterance (for example, the pronunciation of "s" in "ask" and "test"), the pronunciation mainly concentrates on a high frequency portion. However, the filter-based down-sampling method may cause a loss of the high frequency portion (for example, the portion above the horizontal line 1 in the figure of "WB" on the left side of FIG. 1), and may lose a part of low frequency portion near a cut-off frequency (for example, the dark region on top of the figure of "NB" on the right side of FIG. 1). Accordingly, the pronunciation of "s" in a down-sampling result may be greatly weakened, thereby causing a loss in speech information.

In order to reserve all information of the low frequency portion of a SWB signal as much as possible or to reduce the loss in signal intelligibility, it needs to adopt a signal processing method different from a filter-based signal processing method.

In an aspect of the bandwidth expansion, the existing band expansion algorithms are all based on a blind bandwidth extension, that is, in a bandwidth expansion algorithm design, how the down-sampling is performed at a transmitting end is unknown to a receiving end (e.g., a process of converting an original high bandwidth signal into a low frequency bandwidth signal is unknown). That is, the current bandwidth expansion algorithms do not consider the characteristics of a speech signal at the down-sampling end and relevance between high frequency signals and low frequency signals, thus, it cannot achieve optimization. However, mobile communication is symmetric, i.e., down-sampling is accomplished at the transmitting end and up-sampling or bandwidth expansion is accomplished at the receiving end. Therefore, if the receiving end has already known the characteristics of the algorithm with which the transmitting end performs down-sampling processing, the receiving end may fully use the characteristics of this algorithm to perform up-sampling processing, which improves the performance of up-sampling. The up-sampling may also be referred to as bandwidth expansion or super resolution.

In addition, when a neural network is used to implement the up-sampling, usually a convolution operation of a single scale is adopted in each layer of the neural network. However, since frequency period characteristics of a speech signal are influenced by many factors, such as ages or genders of different speakers and contents of speech, if the convolution operation of a single scale is used at each layer of the neural network, then a range of variation of the speech signal cannot be covered. Consequently, this will make speech signal feature information obtained using the neural network less capable of covering various speech audio features, thereby reducing the performances of the down-sampling and the up-sampling.

Thus, it needs a method and device to overcome the above problems and enable the receiving end to provide a better listening experience for users. However, the problems described above are not limited thereto, and the embodiments may overcome other problems associated with optimizing the quality of speech signals.

Figure 2:
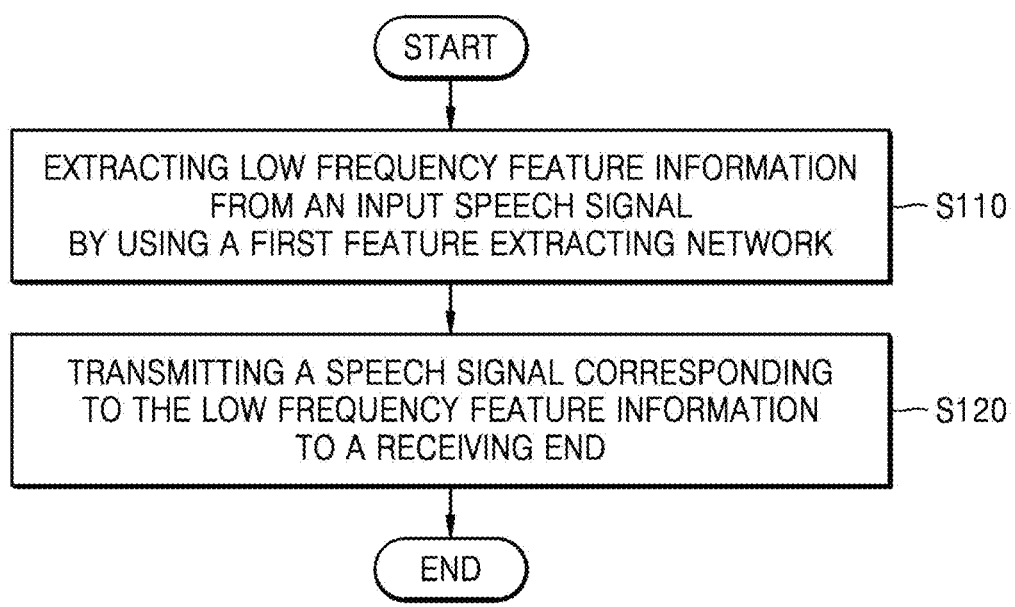
FIG. 2 is a flowchart illustrating a speech transmitting method according to an exemplary embodiment.
Figure 3:
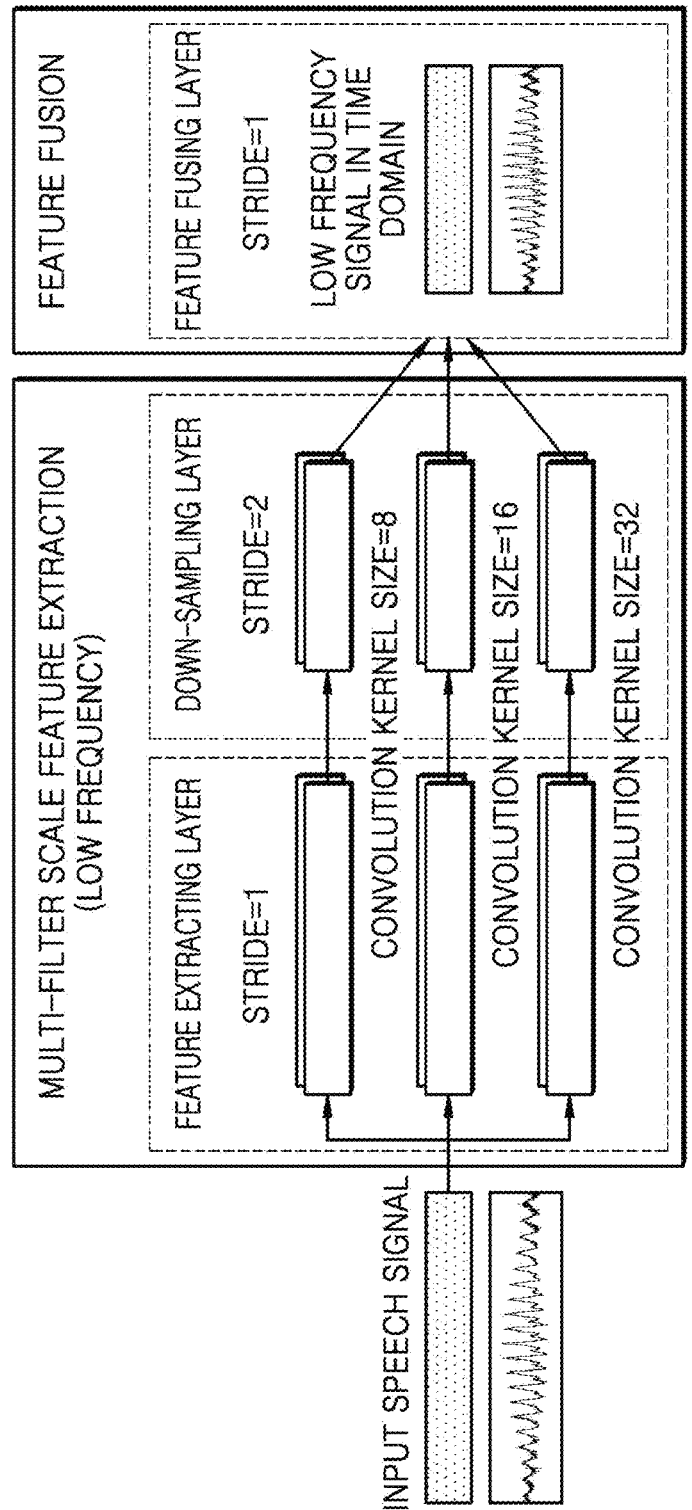
FIG. 3 is a diagram illustrating an example of a down-sampling process based on AI corresponding to the speech transmitting method illustrated in FIG. 2 according to an exemplary embodiment.

FIG. 2 is a flowchart illustrating a speech transmitting method according to an exemplary embodiment of the disclosure and FIG. 3 is a diagram illustrating an example of a down-sampling process based on AI corresponding to the speech transmitting method illustrated in FIG. 2 according to an exemplary embodiment.

The speech transmitting method illustrated in FIG. 2 is a speech transmitting method based on a neural network, wherein the neural network may be convolutional neural networks (CNN), that is to say, the speech transmitting method may be the speech transmitting method based on CNN as illustrated in FIG. 3, and as illustrated in FIG. 3, the speech transmitting method may include two processes: a multiple convolution kernel scale feature extraction (low frequency) process and a feature fusion process, wherein the multiple convolution kernel scale feature extraction may also be referred to as multi-filter scale feature extraction. The multiple convolution kernel scale feature extraction (low frequency) process includes a feature extracting layer and a down-sampling layer of the CNN, and the feature fusion process includes a feature fusing layer of the CNN. The step S110 in FIG. 2 may correspond to the multiple convolution kernel scale feature extraction (low frequency) process in FIG. 3, and the step S120 may correspond to the feature fusion process in FIG. 3. However, the inventive concept is not limited thereto, and the feature extracting network in the transmitting method of the embodiment may also be implemented by deep neural networks (DNN).

In order to facilitate understanding of the embodiment, the speech transmitting method of FIG. 2 will be described according to the processing procedure of the speech transmitting method based on CNN illustrated in FIG. 3.

Referring to FIG. 2, in step S110, low frequency feature information is extracted from an input speech signal by using a first feature extracting network.

The first feature extracting network may include one or more feature extracting modules arranged in a cascading manner. Each feature extracting module may include one or more convolution operations. Each feature extracting module may perform a multiscale convolution operation, that is, performing feature extraction on input information respectively through at least two convolution processing parameters and outputting the extracted feature information. That is, the feature extracting module may include a plurality of convolution operations. Also, the convolution processing parameters of at least two convolution operations may be different, and different convolution processing parameters correspond to different receptive fields and different frequency domain resolutions, that is, corresponding to different sampling scales. The above convolution processing parameter may include a convolution kernel size corresponding to the convolution operation. If the convolution kernel sizes of the convolution operations are different, the receptive fields corresponding to the convolution operations are different, and the frequency domain resolutions are different. Different receptive fields may extract features of different scales (which may also be referred to as granularity). This is different from a filter of a single scale, thus, influence of many factors such as ages or genders of different speakers and contents of speech may be avoided, and a comparatively large range of changes in a speech signal may be covered. The feature information of the speech signal obtained according to the embodiments may cover diversified speech audio features, so the down-sampling performance is improved.

In the feature extracting module, a convolution operation scale may correspond to one or more convolution operations, that is to say, in the feature extracting module, the convolution kernel sizes of respective convolution operations may be different from each other, and/or there may be a case where the convolution kernel sizes of at least two convolution operations are the same, that is, corresponding to the same scale.

The first feature extracting network needs to extract low frequency feature information from the input speech signal, an input of the first feature extracting network is a speech signal collected at the transmitting end, an output of the first feature extracting network is low frequency feature information, and the output low frequency feature information needs to be transmitted to a receiving end through a communication network, thus, a speech sampling rate of the first feature extracting network is determined based on a sampling rate of the input speech signal and a bandwidth supported by the communication network. If the speech signal collected at the transmitting end is a SWB speech signal, and the communication network between the terminals support a bandwidth of WB, then the first feature extracting network needs to implement down-sampling from SWB to NB.

When the first feature extracting network includes a plurality of feature extracting modules, strides of the plurality of feature extracting modules may be different. A stride and a sampling rate of a feature extracting module corresponds to each other, for example, if each stride of feature extracting modules A and B is equal to 1, the sampling rates of the input and the output of the feature extracting modules A and B are not changed, and if a stride of a feature extracting module C is 2, the feature extracting module C performs conversion on the sample rate.

If a feature extracting module includes a plurality of convolution operations, then strides of respective convolution operations may be equal.

The embodiments provide performing down-sampling on a speech signal to be transmitted to the receiving end through the neural network (which may also be referred to as a neural network model, a deep learning model, a deep neural network model, a deep network module, etc.) may effectively reduce a loss of low frequency feature information. Performing a convolution operation on input data may include performing a filtering processing, for example, performing finite impulse response (FIR) filtering.

According to an exemplary embodiment of disclosure, the first feature extracting network may include at least one first feature extracting module and at least one second feature extracting module. As illustrated in FIG. 3, the first feature extracting network may correspond to the multiple convolution kernel scale feature extraction (low frequency) process in FIG. 3, the at least one first feature extracting module may correspond to the feature extracting layer in FIG. 3, and the at least one second feature extracting module may correspond to the down-sampling layer in FIG. 3. The first feature extracting network may include one or more feature extracting layers, and may also include one or more down-sampling layers. FIG. 3 illustrates a case where the first feature extracting network includes one feature extracting layer and one down-sampling layer.

According to an exemplary embodiment of disclosure, the extracting the low frequency feature information from the input speech signal by using the first feature extracting network may include: extracting speech feature information of the input speech signal by using the at least one first feature extracting module.

The at least one first feature extracting module in the first feature extracting network may perform feature extraction on the input information respectively through at least two convolution processing parameters and output the extracted feature information. The at least two convolution processing parameters include at least two of a first convolution processing parameter corresponding to a first receptive field between adjacent samples of a speech signal, a second convolution processing parameter corresponding to a second receptive field of one pitch length, and a third convolution processing parameter corresponding to a third receptive field of at least two pitch lengths, wherein the convolution processing parameter may include a convolution kernel size corresponding to a convolution operation.

In particular, as illustrated in FIG. 3, high frequency features and low frequency features of a speech can be learned by learning at a high frequency sampling rate through a multiscale convolution operation in the feature extracting layer in FIG. 3, that is to say, the speech feature information includes the high frequency features and the low frequency features. In particular, in order to learn features of different high and low frequency sub-bands, the convolution operations may adopt different convolution kernel sizes, and this is because different convolution kernel sizes corresponds to different frequency domain resolutions. The greater the convolution kernel size is, the more complicated the convolution operation and the more accurate the relevant information may be learned. Therefore, with different convolution kernel sizes, the convolution operations may learn features of covering different frequency resolutions. Thus, in FIG. 3, the feature extracting layer performs multiscale feature extraction on the input speech signal with different convolution kernel sizes. As illustrated in FIG. 3, the feature extracting layer has three convolution kernel sizes, that is, 8, 16 and 32. However, the embodiment is not limited thereto, and the feature extracting layer may include other convolution kernel sizes.

Figure 4:
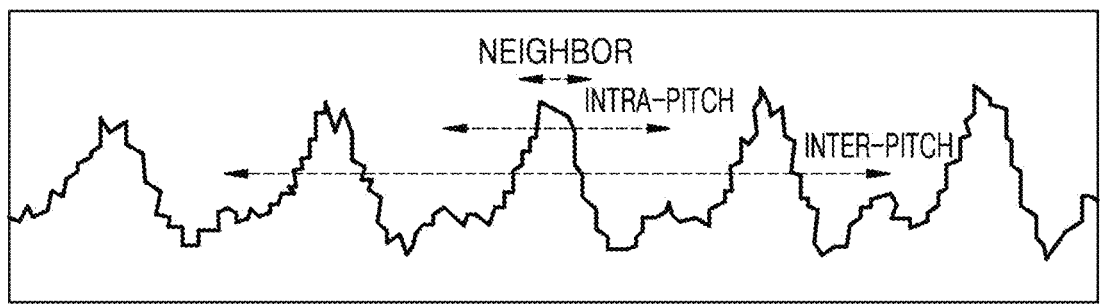
FIG. 4 is a diagram illustrating different convolution kernel sizes covering features of different scales according to an exemplary embodiment.

FIG. 4 is a diagram illustrating different convolution kernel sizes covering features of different scales according to an exemplary embodiment.

As illustrated in FIG. 4, the convolution kernels of different sizes may cover a receptive field between adjacent samples of the input speech signal (e.g., "neighbor"), a receptive field of one pitch length (e.g., "intra-pitch"), and a receptive field of at least two pitch lengths (e.g., "inter-pitch"). That is, the speech transmitting method selects a small convolution kernel size, for example 8, to cover features at a scale of the adjacent samples; the speech transmitting method selects a medium convolution kernel size, for example 16, to cover features at a scale within the same pitch; and the speech transmitting method selects a large convolution kernel size, for example 32, to cover features at scale between different pitches. However, these are only examples, and the speech transmitting method may select any convolution kernel size that may cover the receptive field between adjacent samples, the receptive field of one pitch length, and the receptive field of at least two pitch lengths.

In addition, the convolution operation of each scale in the multiscale convolution operation in the feature extracting layer may include at least one convolution operation. In FIG. 3, the convolution operation of each scale in the multiscale convolution operation in the feature extracting layer includes two convolution operations. A stride of the convolution operation of each scale in the multiscale convolution operation in the feature extracting layer may be 1, so that the signal scale is not changed, for example, if a shape of the input speech signal is [640, 1], wherein 640 represents a length of the input speech signal and 1 represents the number of the speech, then a shape of the output from the feature extracting layer is 3*[640, 2], wherein 3 represents that the output of the feature extracting layer is data of three scales. That is, a shape of the signal output from the convolution operation of each scale in the multiscale convolution operation in the feature extracting layer is [640, 2], wherein 640 represents a length of the output feature information, and 2 represents the number of the output feature information. Since the convolution operation of each scale includes two convolution operations, the number of the feature information output from the convolution operation of each scale is 2.

Hereafter, the extracting the low frequency feature information from the input speech signal by using the first feature extracting network also includes: obtaining the low frequency feature information according to the extracted speech feature information by using the at least one second feature extracting module.

According to an exemplary embodiment of disclosure, the obtaining the low frequency feature information may include: performing feature extraction on the input information respectively through at least two convolution processing parameters, and outputting the extracted feature information. That is to say, at least one second feature extracting module in the first feature extracting network may perform feature extraction on the input speech feature information respectively through at least two convolution processing parameters, and output the extracted feature information. The at least two convolution processing parameters include at least two of a convolution processing parameter corresponding to a receptive field between adjacent samples of a speech signal, a convolution processing parameter corresponding to a receptive field of one pitch length, and a convolution processing parameter corresponding to a receptive field of at least two pitch lengths, wherein the convolution processing parameter may include a convolution kernel size corresponding to a convolution operation.

As illustrated in FIG. 3, the low frequency feature information including relevant information between the high frequency features and the low frequency features is obtained by performing convolution on the speech feature by setting strides of the convolution operations in the down-sampling layer to be 2. In particular, the speech transmitting method may perform convolution and sampling rate conversion on the speech feature extracted in step S110 by using the multiscale convolution operation in the down-sampling layer. In other words, the speech transmitting method may perform the convolution and the sampling rate conversion by performing convolution on the speech feature through the multiscale convolution operation in the down-sampling layer, to fuse the relevant information between the high frequency features and the low frequency features into the low frequency feature information so as to obtain the low frequency feature information including the relevant information. The receiving end of the speech signal may better recover the high frequency feature information according to the relevant information.

In addition, in the example illustrated in FIG. 3, the speech transmitting method uses, in the at least one second feature extracting module, convolution processing parameters that are the same as the convolution processing parameters used in the at least one first feature extracting module, that is, the speech transmitting method uses, in the down-sampling layer, the multiscale convolution operation of which the number and size of convolution operations are the same as those of the multiscale convolution operation in the feature extracting layer. For example, as illustrated in FIG. 3, the multiscale convolution operation in the down-sampling layer has three convolution kernel sizes at 8, 16 and 32, each convolution operation in the multiscale convolution operation has two convolution operations, and each convolution operation is implemented by one convolution kernel. Thus, as illustrated in FIG. 3, in order to perform convolution and sampling rate conversion through the multiscale convolution operation in the down-sampling layer, a stride of each kind of convolution operation in the multiscale convolution operation in the down-sampling layer is set to be 2 in the example illustrated in FIG. 3. In this case, if a shape of the signal output from the feature extracting layer is 3*[640,2], then a shape of the signal output from the down-sampling layer is 3*[320,2]. Here, the reason for setting the stride of the filter to be 2 is that a frequency of the SWB is two times that of the WB.

Although the speech transmitting method uses, in the at least one second feature extracting module, the convolution processing parameters that are the same as the convolution processing parameters used in the at least one first feature extracting module, the embodiments are not limited thereto. The at least one second feature extracting module may also use convolution processing parameters that are different from the convolution processing parameters used in the at least one first feature extracting module. In this case, a form of speech feature information suitable for being processed by the at least one second feature extracting module can be obtained by fusing and outputting respective speech feature information extracted by the at least one first feature extracting module, for example, assume that the multiscale convolution operation in the down-sampling layer in FIG. 3 has three convolution kernel sizes, that is, 8, 16 and 32, and the multiscale convolution operation in the down-sampling layer has two convolution kernel sizes, that is, 16 and 32. In this case, the feature extracting layer may fuse speech feature information output by respective convolution operations, and output the fused feature information to the down-sampling layer, and respective convolution operations of the down-sampling layer perform multiscale convolution operation respectively on the fused feature information output by the feature extracting layer.

Referring back to FIG. 2, in step S120, a speech signal corresponding to the low frequency feature information is transmitted to the receiving end.

According to an exemplary embodiment of disclosure, the transmitting the speech signal corresponding to the low frequency feature information to the receiving end may include: fusing all low frequency feature information output by the first feature extracting network by using the first feature fusing network to obtain the speech signal corresponding to the low frequency feature information, and transmitting the speech signal corresponding to the low frequency feature information to the receiving end. In the example illustrated in FIG. 3, the first feature fusing network corresponds to the feature fusing layer in FIG. 3. The down-sampling layer outputs the extracted low frequency feature information obtained through respective convolution operations, and the feature fusing layer fuses all low frequency feature information output by the down-sampling layer. In particular, through step S110, the speech transmitting method obtains the low frequency feature information at different scales through the down-sampling layer.

Hereafter, the speech transmitting method performs convolution processing on the low frequency feature information at the different scales obtained through the down-sampling layer, by setting a stride of a single convolution operation in the feature fusing layer to be 1, so as to obtain the speech signal corresponding to the low frequency feature information. As illustrated in FIG. 3, the speech transmitting method obtains the low frequency feature information at three scales through the down-sampling layer, and each scale may also include a plurality of low frequency feature information. The speech transmitting method may perform convolution processing on the low frequency feature information at three scales through the feature fusing layer, so as to obtain the speech signal corresponding to low frequency feature information that needs to be output finally, and transmits the speech signal to the receiving end, for example, if a shape of the signal output by the down-sampling layer is 3*[320,2], then a shape of the signal output from the feature fusing layer is [320,1].

The signal output by the feature fusing layer is a low frequency time domain signal. The low frequency time domain signal is formed into a stream after being encoded, and the transmitting end transmits the stream to the receiving end.

In addition, the number of convolution operations in the feature extracting layer, the down-sampling layer and the feature fusing layer in the down-sampling process based on AI illustrated in FIG. 3 and the number of convolution kernels included in each convolution operation are only exemplary, and the embodiments of disclosure are not limited thereto. In addition, since a design for the number of convolution operations determines richness of speech information at different frequencies that may be learned by the speech transmitting method, when the number of convolution operations is designed, a model corresponding to the speech transmitting method may be executed on a corresponding device (e.g., a smart phone), and a testing result of the speech transmitting method based on the mobile speech quality testing standards (such as Perceptual Objective Listening Quality Assessment (POLQA)) may output speech information that is better than that of the traditional bandwidth extension (BWE) method. Thus, the overall number of convolution operations in the feature extracting layer, the down-sampling layer and the feature fusing layer may be determined according to the performance of a platform to which the speech transmitting method is applied and the testing result based on the mobile speech quality testing standards.

Compared with the traditional methods, the above described speech transmitting method corresponding to the down-sampling process based on AI may reserve low frequency features of the input speech signal substantially, and include the relevant information between the high frequency features and the low frequency features in the low frequency feature information. Here, the feature extracting layer may reserve more information of the input speech signal to make the low frequency information more complete. The down-sampling layer may fuse the relevant information between the high frequency features and the low frequency features into the low frequency feature information so as to make the high frequency features be reconstructed more accurately in a speech receiving end. In addition, since the traditional down-sampling method only uses a simple filter of a single scale, it may lose low frequency information of a speech signal in the process of sampling rate conversion, so it is hard to recover the high frequency features of the speech signal from the low frequency feature information by the speech receiving apparatus, and also hard to recover better high frequency features in the up-sampling process. These two technologies adopted in the embodiments will improve articulation of a speech, thereby improving the user experience of listening to a speech signal.

In addition, in actual application, a speech sender is also a speech receiver of another speech sender. Thus, the speech transmitting method may also include: receiving a speech signal transmitted from the other speech sender; extracting low frequency feature information from the received speech signal and recovering high frequency feature information by using a second feature extracting network; and outputting a speech signal including the low frequency feature information and the high frequency feature information. Hereafter, the speech receiving method will be described in details.

The receiving of the speech signal transmitted from the other speech sender includes: receiving a stream corresponding to the speech signal transmitted by the other speech sender through the communication network, and decoding the received stream to obtain the speech signal.

In addition, although the speech transmitting method based on the neural network is described based on the CNN as an example in the above descriptions, the neural network on which the speech transmitting method of the embodiment is based may also be the deep neural networks (DNN). In other words, the first feature extracting network and the first feature fusing network may be implemented based on the DNN.

Figure 5:
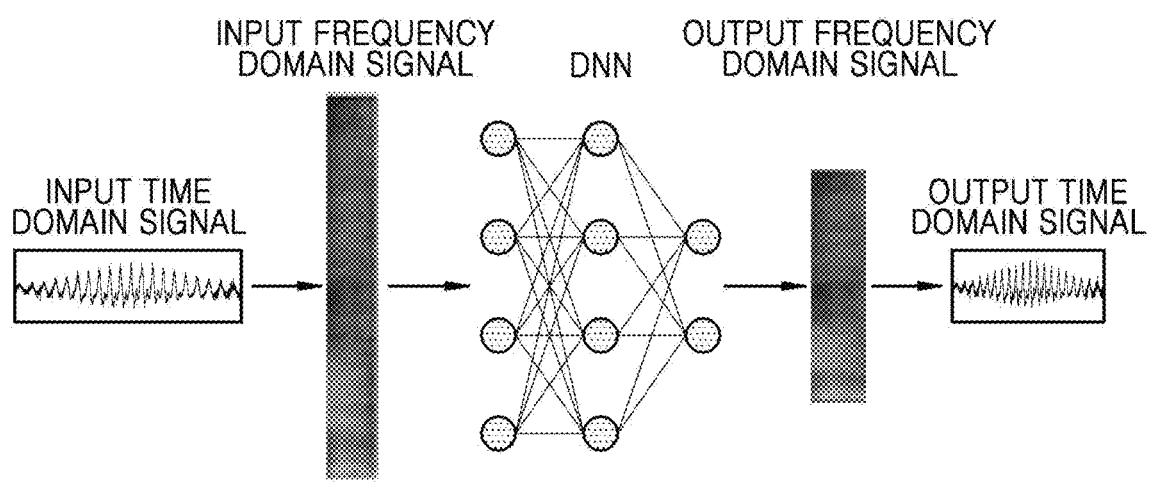
FIG. 5 is a diagram illustrating an example of a down-sampling process based on AI corresponding to the speech transmitting method illustrated in FIG. 2 according to another exemplary embodiment.

FIG. 5 is a diagram illustrating an example of a down-sampling process based on AI corresponding to the speech transmitting method illustrated in FIG. 2 according to another exemplary embodiment.

As illustrated in FIG. 5, a high frequency speech signal is input and converted from a time domain to a frequency domain. Then, a conversion from a high frequency to a low frequency is performed on information (i.e., input speech signal) in the frequency domain through the DNN to obtain low frequency information in the frequency domain. Subsequently, the low frequency information in the frequency domain is converted from the frequency domain to the time domain to obtain an output low frequency signal in the time domain, and the low frequency signal in the time domain is transmitted to the receiving end through the encoded stream.

Figure 6:
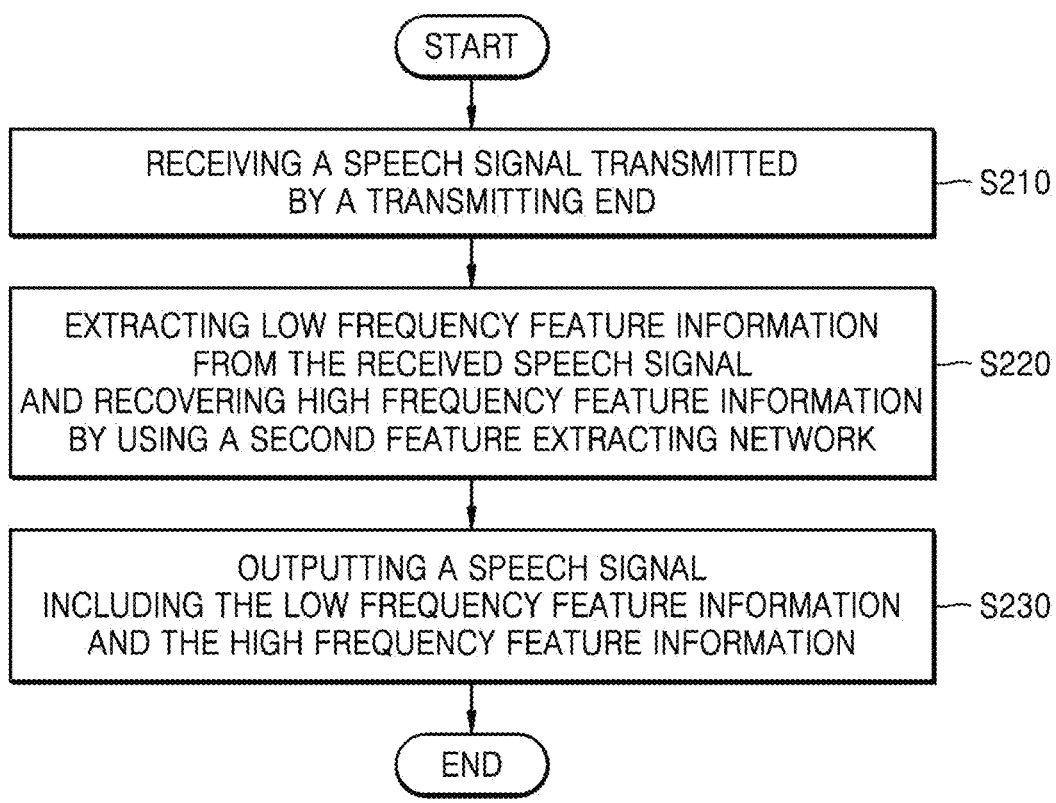
FIG. 6 is a flowchart illustrating a speech receiving method according to an exemplary embodiment.

FIG. 6 is a flowchart illustrating a speech receiving method according to an exemplary embodiment.

In step S210, a speech signal transmitted by a transmitting end is received by a receiving end.

In step S220, low frequency feature information is extracted from the received speech signal and high frequency feature information is recovered, by using a second feature extracting network.

In step S230, a speech signal including the low frequency feature information and the high frequency feature information is output.

Hereafter, the speech receiving method illustrated in FIG. 6 will be described in details with reference to FIGS. 7 to 10a-10D.

After receiving a stream corresponding to the speech signal through the communication network, a receiving end decodes the stream to obtain the speech signal, extracts the low frequency feature information using a second feature network, and recovers the high frequency feature information.

Figure 7:
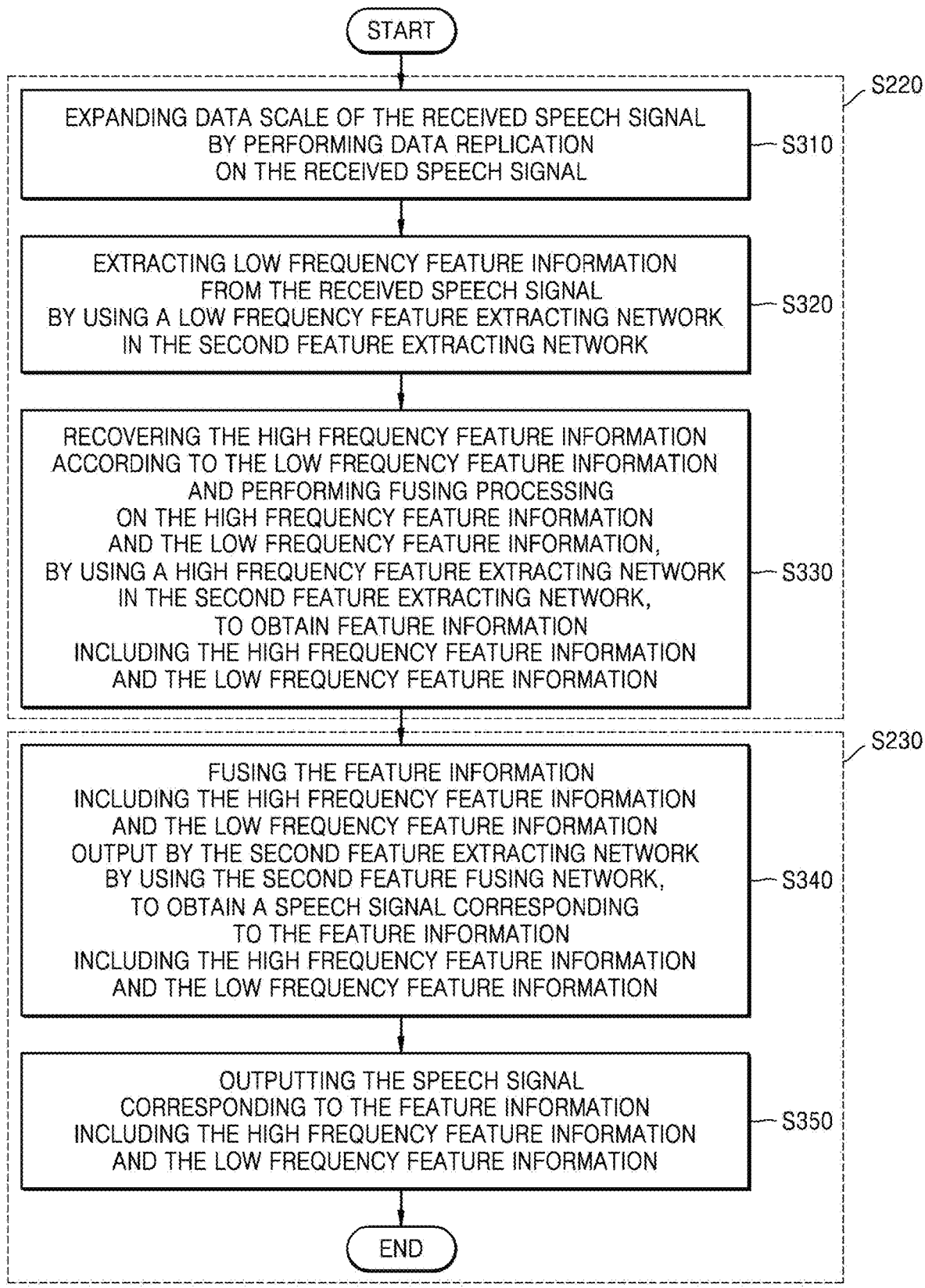
FIG. 7 is a flowchart illustrating the speech receiving method according to an exemplary embodiment.
Figure 8:
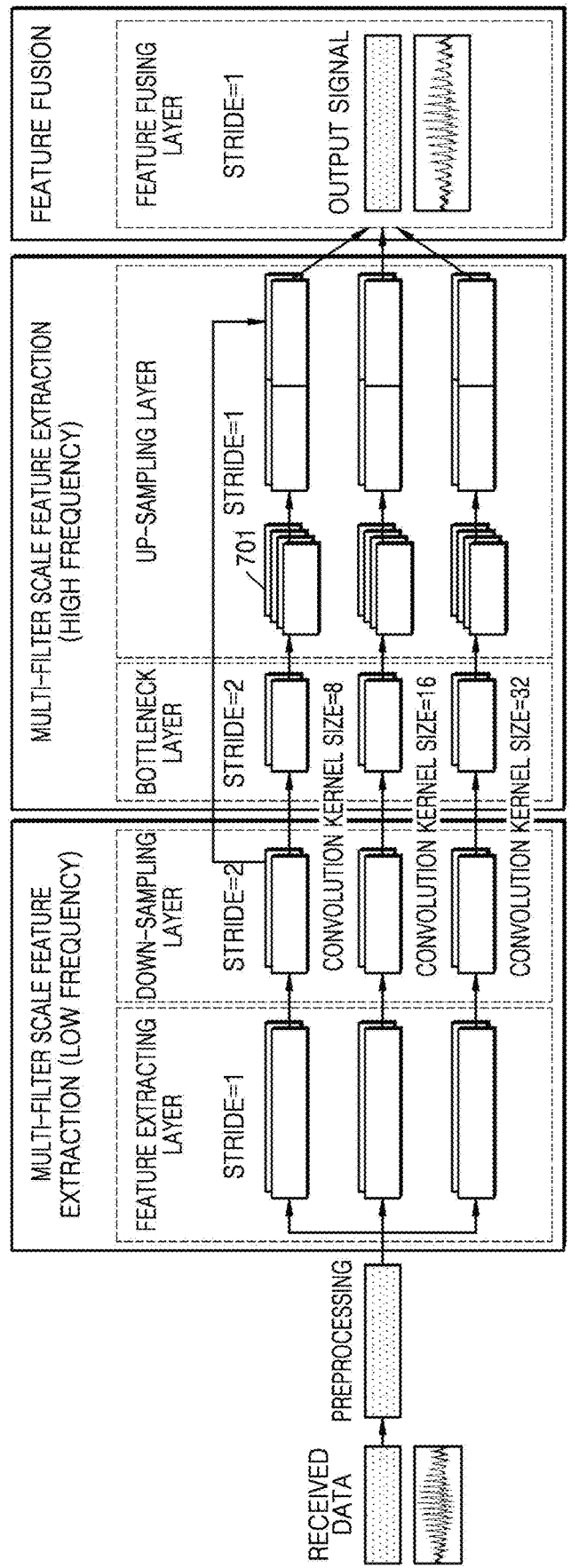
FIG. 8 is a diagram illustrating an example of an up-sampling process based on AI corresponding to the speech receiving method illustrated in FIG. 6 according to an exemplary embodiment.

FIG. 7 is a flowchart illustrating the speech receiving method according to an exemplary embodiment, and FIG. 8 is a diagram illustrating an example of an up-sampling process based on AI corresponding to the speech receiving method illustrated in FIG. 6 according to an exemplary embodiment.

The speech receiving method illustrated in FIG. 7 is a speech receiving method based on the neural network. The neural network may be convolutional neural networks (CNN), that is, the speech receiving method illustrated in FIG. 7 may be a speech receiving method based on the CNN as illustrated in FIG. 8.

The second feature extracting network may include one or more feature extracting modules arranged in a cascading manner. Each feature extracting module may include one or more convolution operations. Each feature extracting module may perform a multiscale convolution operation. Different convolution processing parameters (for example, a convolution kernel size) correspond to different receptive fields and correspond to different frequency domain resolutions, thus, influence of many factors such as ages or genders of different speakers and contents of speech may be avoided, and a comparatively large range of variations in a speech signal may be covered. The feature information of the speech signal obtained according to the embodiments may cover diversified speech audio features, by improving the down-sampling performance.

In the feature extracting module, a convolution operation scale may correspond to one or more convolution operations, that is, the convolution kernel sizes of respective convolution operations may be different from each other. In addition, in a case where the convolution kernel sizes of at least two convolution operations are the same, it may mean that corresponding to the same scale.

When the second feature extracting network includes a plurality of feature extracting modules, strides of the plurality of feature extracting modules may be different. A stride and a sampling rate of a feature extracting module corresponds to each other, for example, if each stride of feature extracting modules A and B is 1, the sampling rates of the input and the output of the feature extracting modules A and B are not changed, and if a stride of a feature extracting module C is 2, the feature extracting module C performs conversion on the sample rate.

If a feature extracting module includes a plurality of convolution operations, then strides of respective convolution operations may be equal.

As illustrated in FIG. 8, the speech receiving method includes three processes: a multi-filter scale feature extraction (low frequency) process, a multi-filter scale feature extraction (high frequency) process, and a feature fusion process, wherein the multi-filter scale feature extraction may also be referred to as multiple convolution kernel scale feature extraction. The multiple convolution kernel scale feature extraction (low frequency) process includes a feature extracting layer and a down-sampling layer, and corresponds to steps S310 and S320 in FIG. 7. The multiple convolution kernel scale feature extraction (high frequency) process includes a bottleneck layer and an up-sampling layer of the CNN, and corresponds to step S330 in FIG. 7, and the feature fusion process includes a feature fusing layer of the CNN, and corresponds to steps S340 and S350 in FIG. 7. However, the embodiment is not limited thereto, and the feature extracting network in the speech receiving method of the embodiment may also be implemented by the DNN (deep neural networks).

In order to facilitate understanding of the embodiment, the speech receiving method of FIG. 7 will be specifically described as follows according to the processing procedure of the speech receiving method based on CNN illustrated in FIG. 8.

In step S310, data replication is performed on the received speech signal, so as to expand data scale of the received speech signal. In particular, this step corresponds to a preprocessing process, that is, performing scale expansion on the received data to obtain data to be processed, and this process corresponds to a preprocessing procedure in FIG. 8. The speech receiving method accomplishes the scale expansion by performing spaced and repeated replication on the received data, for example, if the received data is [0,1,2,3,4], then the expanded data is [0,0,1,1,2,2,3,3,4,4], and this step may accomplish a symmetric expansion in form from the low frequency information in the frequency domain to the high frequency information in frequency domain.

In step S320, the low frequency feature information is extracted from the received speech signal by using a low frequency feature extracting network in the second feature extracting network, wherein the low frequency feature information includes relevant information between high frequency features and low frequency features.

In particular, the low frequency feature extracting network includes at least one third feature extracting module and at least one fourth feature extracting module. As illustrated in FIG. 8, the second feature extracting network may correspond to the multiple convolution kernel scale feature extraction (low frequency) process and the multiple convolution kernel scale feature extraction (high frequency) process in FIG. 8, and the low frequency extracting network may correspond to the multiple convolution kernel scale feature extraction (low frequency) process in FIG. 8. In addition the at least one third feature extracting module may correspond to the feature extracting layer in FIG. 8, and the at least one fourth feature extracting module may correspond to the down-sampling layer in FIG. 8.

The low frequency feature extracting network may include one or more feature extracting layers, and may also include one or more down-sampling layers. In particular, the extracting the low frequency feature information from the received speech signal by using the low frequency feature extracting network in the second feature extracting network may include: extracting speech feature information of the received speech signal by using the at least one third feature extracting module, wherein the at least one third feature extracting module in the second feature extracting network performs feature extraction on the input information respectively through at least two convolution processing parameters, and outputs the extracted feature information.

The at least two convolution processing parameters include at least two of a convolution processing parameter corresponding to a receptive field between adjacent samples of a speech signal, a convolution processing parameter corresponding to a receptive field of one pitch length, and a convolution processing parameter corresponding to a receptive field of at least two pitch lengths, wherein the convolution processing parameter may include a convolution kernel size corresponding to a convolution operation.

In particular, as illustrated in FIG. 8, the extracting the speech feature information may include: performing multi-scale feature extraction on the expanded speech signal by setting a stride of the multiple scale convolution operation in the feature extracting layer to be 1, so as to obtain the speech feature information. In this step, the speech receiving method does not change the scale of the signal, thus, the stride of the multiscale convolution operation in the feature extracting layer is set to be 1. In addition, the feature extracting layer reuses the design of the feature extracting layer in the speech transmitting method.

In other words, the number and size of convolution operations in the feature extracting layer in the speech receiving method are the same as those in the feature extracting layer in the speech transmitting method. That is to say, the feature extracting layer in the speech receiving method reuses the design of the feature extracting layer in the speech transmitting method. This enables the up-sampling process based on AI of the speech receiving device to better recover information obtained in the down-sampling process based on AI of the speech transmitting device. Thus, as illustrated in the down-sampling process based on AI in FIG. 3, the multiscale convolution operation in the feature extracting layer in the up-sampling process based on AI illustrated in FIG. 8 also has three convolution kernel sizes, that is, 8, 16 and 32.

Meanwhile, the convolution operation of each scale in the multiscale convolution operation has two convolution operations. Thus, the speech receiving method may perform extraction on speech feature by using the multiscale convolution operation having different sizes. For example, if a shape of the input expanded speech signal is [640,1], then since the stride of the multiscale convolution operation in the feature extracting layer is set to be 1, a shape output from the feature extracting layer is 3*[640,2].

The convolution operation of each scale in the feature extracting layer may also include one convolution operation, or more than two convolution operations.

In addition, the extracting the low frequency feature information from the received speech signal by using the low frequency feature extracting network in the second feature extracting network may also include: obtaining the low frequency feature information according to the extracted speech feature information by using the at least one fourth feature extracting module, wherein the at least one fourth feature extracting module in the second feature extracting network performs feature extraction on the input information respectively through at least two convolution processing parameters, and outputs the extracted feature information.

The at least two convolution processing parameters include at least two of a convolution processing parameter corresponding to a receptive field between adjacent samples of a speech signal, a convolution processing parameter corresponding to a receptive field of one pitch length, and a convolution processing parameter corresponding to a receptive field of at least two pitch lengths, wherein the convolution processing parameter may include a convolution kernel size corresponding to a convolution operation.

For example, as illustrated in FIG. 8, while obtaining the low frequency feature information, the speech feature may be perform convolution by setting a stride of the multiscale convolution operation in the down-sampling layer to be 2 so as to obtain the low frequency feature information.

In addition, the down-sampling layer reuses the design of the down-sampling layer in the speech transmitting method. In other words, the number and size of convolution operations in the down-sampling layer in the speech receiving method are the same as those in the down-sampling layer in the speech transmitting method. That is to say, the down-sampling layer in the speech receiving method reuses the design of the down-sampling layer in the speech transmitting method. This enables the up-sampling process based on AI of the speech receiving device to better recover information obtained in the down-sampling process based on AI of the speech transmitting device. Correspondingly, the speech receiving method uses, in the down-sampling layer, the multiscale convolution operation of which the number and size of convolution operations are the same as those of the multiscale convolution operation used in the feature extracting layer, for example, as illustrated in FIG. 8, the multi scale convolution operation in the down-sampling layer has three convolution kernel sizes, that is, 8, 16 and 32, each kind of convolution operation in the multiscale convolution operation has two convolution operations, and each convolution operation has one convolution kernel. Thus, in order to perform convolution through the multiscale convolution operation in the down-sampling layer so as to perform sampling rate conversion, a stride of each convolution operation in the multiscale convolution operation in the down-sampling layer is set to be 2 in the example illustrated in FIG. 8. For example, if a shape of the signal output from the feature extracting layer is 3*[640,2], then a shape of the signal output from the down-sampling layer is 3*[320,2]. Here, the reason for setting the stride of the convolution operation in the down-sampling layer to be 2 is that a frequency of the SWB is two times that of the WB.

The feature extracting layer and the down-sampling layer in the up-sampling process of the speech receiving method based on AI described with reference to FIG. 8 and the feature extracting layer and the down-sampling layer in the down-sampling process of the speech transmitting method based on AI use the same size and number of convolution operations on the same signal scale. Accordingly, the up-sampling process based on AI of the speech receiving apparatus and down-sampling process based on AI of the speech transmitting apparatus may extract low frequency information and recover a signal from the information according to the same way of operation. Such operations enable the up-sampling process based on AI of the speech receiving apparatus to better recover information obtained in the down-sampling process based on AI of the speech transmitting apparatus.

In step S330, by using a high frequency feature extracting network in the second feature extracting network, the high frequency feature information is recovered according to the low frequency feature information, and the high frequency feature information and the low frequency feature information is performed fusing process to obtain feature information including the high frequency feature information and the low frequency feature information.

In particular, the high frequency feature extracting network includes at least one fifth feature extracting module and at least one sixth feature extracting module. As illustrated in FIG. 8, the high frequency extracting network may correspond to the multiple convolution kernel scale feature extraction (high frequency) process in FIG. 8, the at least one fifth feature extracting module may correspond to the bottleneck layer in FIG. 8 or a convolution layer in the up-sampling layer in FIG. 8, and the at least one sixth feature extracting module may correspond to a joining layer in the up-sampling layer in FIG. 8. In particular, the recovering the high frequency feature information according to the low frequency feature information and performing the fusing processing on the high frequency feature information and the low frequency feature information by using the high frequency feature extracting network in the second feature extracting network may include: recovering the high frequency feature information according to the low frequency feature information by using the at least one fifth feature extracting module.

The at least one fifth feature extracting module in the second feature extracting network performs feature extraction on input information respectively through at least two convolution processing parameters, and outputs the extracted feature information. The at least two convolution processing parameters include at least two of a convolution processing parameter corresponding to a receptive field between adjacent samples of a speech signal, a convolution processing parameter corresponding to a receptive field of one pitch length, and a convolution processing parameter corresponding to a receptive field of at least two pitch lengths, wherein the convolution processing parameter may include a convolution kernel size corresponding to a convolution operation.

In particular, as illustrated in FIG. 8, the recovering the high frequency feature information may include: performing convolution on the low frequency feature information by setting a stride of the multiscale convolution operation in the bottleneck layer to be 2, so as to obtain the convolved feature information, wherein the low frequency feature information obtained by the down-sampling layer is actually the low frequency feature information to which the relevant information between the high frequency features and the low frequency features has been fused.

The bottleneck layer may perform fusion processing on the low frequency feature information including the relevant information, wherein the bottleneck layer may be implemented through bottleneck convolutions. For example, the bottleneck layer may perform processing on the multiscale low frequency feature information output from the down-sampling layer by setting a stride of the multiscale convolution operation in the bottleneck layer to be 2, wherein the multiscale convolution operation of which the number and size of convolution operations are the same as those of the multiscale convolution operation used in the down-sampling layer may be used in the bottleneck layer. As illustrated in FIG. 8, the convolution operation of each scale in the multiscale convolution operation in the bottleneck layer includes two convolution operations, and as illustrated in FIG. 8, sizes of the convolution kernels may be 8, 16 and 32. Thus, as illustrated in FIG. 8, if a shape of the signal output from the down-sampling layer is 3*[320,2], then a shape of the signal output from the bottleneck layer is 3*[160, 2].

The convolution operation of each scale in the feature extracting layer may also include one convolution operation, or more than two convolution operations.

In addition, as illustrated in FIG. 8, the recovering the high frequency feature information may also include: performing convolution on the low frequency feature information by setting a stride of the multiscale convolution operation in the up-sampling layer to be 1, and arranging the convolution result, so as to obtain the high frequency feature information. The speech receiving method uses, in the up-sampling layer, the multiscale convolution operation of which the number and size of convolution operations are the same as those of the multiscale convolution operation in the bottleneck layer.

As illustrated in FIG. 8, each convolution operation in the multiscale convolution operation of the up-sampling layer includes four convolution operations. Here, each of the four convolution operations may include one convolution kernel, where the sizes of the convolution kernels may be 8, 16 and 32. In this step, the speech receiving method performs convolution processing on the low frequency feature information output by the bottleneck layer by setting a stride of the multiscale convolution operation of the convolution layer in the up-sampling layer to be 1, for example, if a shape of the signal output from the bottleneck layer is 3*[160,2], then the convolution result is 3*[160,4], wherein this step of convolution processing fuses information obtained by the bottleneck layer.

Hereafter, the up-sampling layer rearranges the convolution result, so as to further obtain the rearranged high frequency feature information. For example, if the convolution result is 3*[160,4], then the rearranged high frequency feature information is 3*[320,2], wherein the method adopted in the rearrangement is a cross arranging method. That is, as illustrated in FIG. 8, under each convolution operation, the convolution result has four groups of data (the four groups of data indicated as 701 in FIG. 8), e.g., a first group [a1, a2, a3, a4, . . . , an], a second group [b1, b2, b3, b4, . . . , bn], a third group [c1, c2, c3, c4, . . . , cn], and a fourth group [d1, d2, d3, d4, . . . , dn], and then the rearranged results are [a1, b1, a2, b2, a3, b3, a4, b4, . . . , an, bn] and [c1, d1, c2, d2, c3, d3, c4, d4, . . . , cn, dn], that is to say, the data in the first and second groups are arranged crosswise, and the data in the third and fourth groups are arranged crosswise. However, the method adopted in the rearrangement is only exemplary, and the embodiment is not limited thereto.

Through the above operations, the high frequency feature information may be recovered.

In the embodiments, the low frequency feature information of the speech signal transmitted by the transmitting end also includes the relevant information between the high frequency features and the low frequency features, and with the use of the relevant information, the receiving end may learn the relationship between the high frequency features and the low frequency features, and based on the learned relationship, the receiving end may better recover the high frequency features according to the low frequency features.

In addition, the recovering the high frequency feature information according to the low frequency feature information and performing the fusing processing on the high frequency feature information and the low frequency feature information by using the high frequency feature extracting network in the second feature extracting network may also include: performing the fusing processing on the high frequency feature information and the low frequency feature information extracted by the corresponding fourth feature extracting module, by using the at least one sixth feature extracting module, to obtain the feature information including the high frequency feature information and the low frequency feature information.

For the input high frequency feature information respectively corresponding to at least two convolution processing parameters, the at least one sixth feature extracting module performs fusing processing on the high frequency feature information and the low frequency feature information extracted by the corresponding fourth feature extracting module according to corresponding convolution processing parameters respectively, and outputs feature information including the high frequency feature information and the low frequency feature information. The at least two convolution processing parameters include at least two of a convolution processing parameter corresponding to a receptive field between adjacent samples of a speech signal, a convolution processing parameter corresponding to a receptive field of one pitch length, and a convolution processing parameter corresponding to a receptive field of at least two pitch lengths, wherein the convolution processing parameter may include a convolution kernel size corresponding to a convolution operation.

Referring to FIG. 8, it may obtain the data including the high and low frequency information by joining the high frequency feature information and the low frequency feature information. The feature information including the high frequency feature information and the low frequency feature information at different scales may be obtained by joining the high frequency feature information output by the convolution layer in the up-sampling layer and the low frequency feature information output by the convolution processing in the down-sampling layer. For example, if a shape of the signal output by the convolution layer in the up-sampling layer is 3*[320,2], and a shape of the signal output by the convolution processing in the down-sampling layer is 3*[320,2], then the result from the joining is 3*[640,2]. This step simply joins the high frequency feature information in front of the low frequency feature information to obtain the feature information including the high frequency feature information and the low frequency feature information.

In step S340, the feature information including the high frequency feature information and the low frequency feature information output by the second feature extracting network is fused by using the second feature fusing network, to obtain a speech signal corresponding to the feature information including the high frequency feature information and the low frequency feature information.

As illustrated in FIG. 8, a fusing processing is performed on the feature information including the high frequency feature information and the low frequency feature information by setting a stride of a single convolution operation in the feature fusing layer of the CNN to be 1, and obtain an output signal. In addition, the feature fusing layer reuses the design of the feature fusing layer in the speech transmitting method. In other words, the number and size of convolution operations in the feature fusing layer are the same as those in the feature fusing layer in the speech transmitting method. That is to say, the feature fusing layer in the speech receiving method reuses the design of the feature fusing layer in the speech transmitting method.

Referring to FIG. 8, the speech receiving method performs convolution processing on the feature information including the high frequency feature information and the low frequency feature information at different scales by using the feature fusing layer to obtain a speech signal corresponding to the feature information including the high frequency feature information and the low frequency feature information. For example, if a shape of the signal input to the feature fusing layer is 3*[640,2], then a shape of the signal output from the feature fusing layer is [640,1].

In step S350, the speech signal corresponding to the feature information including the high frequency feature information and the low frequency feature information is output.

Compared with the traditional down-sampling method, the down-sampling method according to an embodiment may better reserve information of the down-sampling, and improve speech intelligibility. In addition, the method of jointly designing up-sampling and down-sampling of the embodiment may effectively improve a signal-to-noise ratio (SNR) value and a Perceptual Objective Listening Quality Analysis (POLQA) test result.

FIG. 9 is a flowchart illustrating the speech receiving method according to another exemplary embodiment.

Figure 10A:
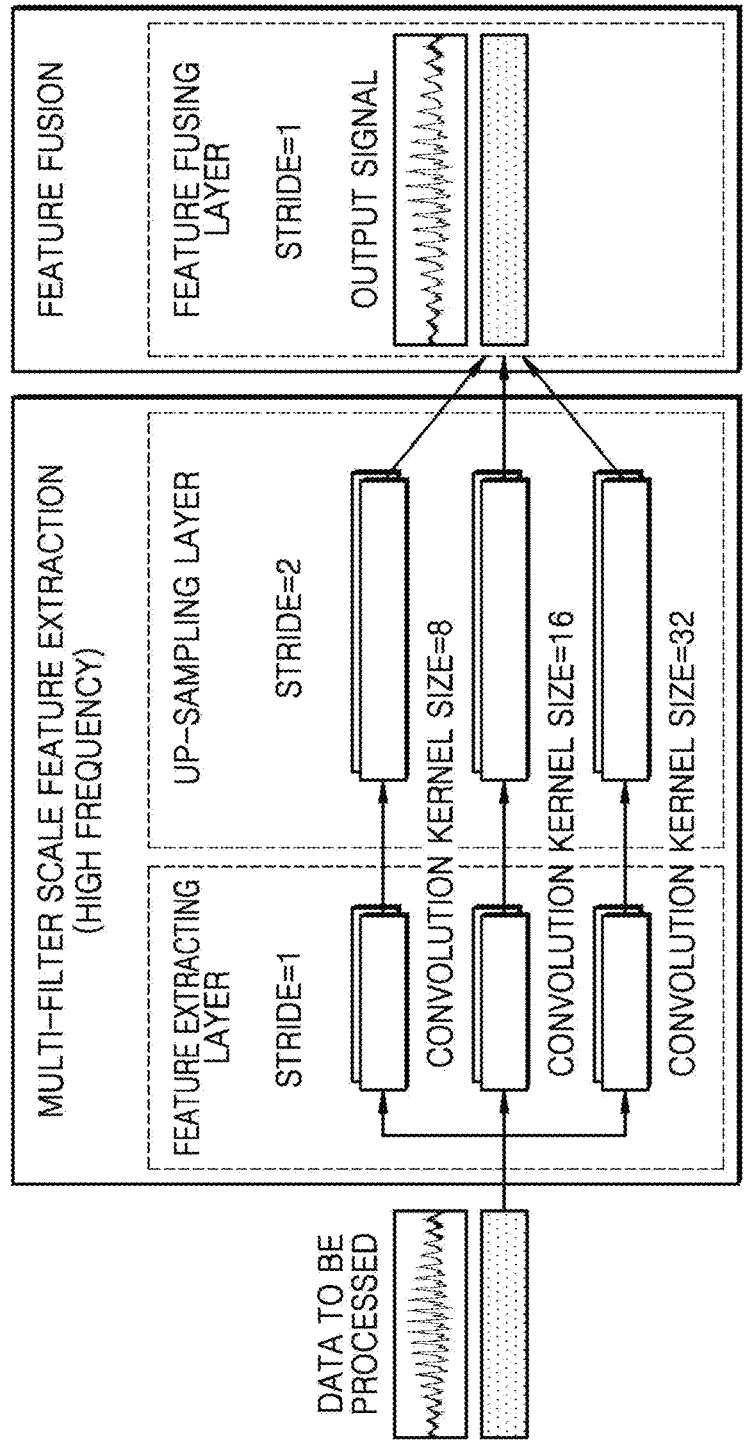
FIG. 10A is a diagram illustrating an example of the up-sampling process based on AI corresponding to the speech receiving method illustrated in FIG. 6 according to another exemplary embodiment.

The speech transmitting method illustrated in FIG. 9 is a speech receiving method based on the neural network, wherein the neural network may be convolutional neural networks (CNN), that is to say, the speech receiving method illustrated in FIG. 9 may be a speech receiving method based on CNN as illustrated in FIG. 10A.

FIG. 10A is a diagram illustrating an example of the up-sampling process based on AI corresponding to the speech receiving method illustrated in FIG. 6 according to another exemplary embodiment.

As illustrated in FIG. 10A, the speech receiving method may include two processes: a multi-filter scale feature extraction (high frequency) process, and a feature fusion process, wherein the multi-filter scale feature extraction may also be referred to as the multiple convolution kernel scale feature extraction. The multiple convolution kernel scale feature extraction (high frequency) process may include a feature extracting layer and an up-sampling layer of the CNN, and corresponds to steps S410 and S420 in FIG. 9, and the feature fusion process includes a feature fusing layer of the CNN, and corresponds to steps S430 and S440 in FIG. 9.

However, the embodiments are not limited thereto. A feature extracting network in the speech receiving method of the embodiment may also be implemented by the DNN (deep neural networks).

In order to facilitate understanding of the embodiment, the speech receiving method of FIG. 9 will be described as follows according to the processing procedure of the speech receiving method based on the CNN as illustrated in FIG. 10A.

In step S410, speech feature information of the received speech signal is extracted by using at least one seventh feature extracting module. The second feature extracting network may include at least one seventh feature extracting module and at least one eighth feature extracting module. However, the at least one seventh feature extracting module may be provided separately from the second feature extracting network according to an embodiment. As illustrated in FIG. 10A, the second feature extracting network may correspond to the multiple convolution kernel scale feature extraction (high frequency) process in FIG. 10A, and the at least one seventh feature extracting module may correspond to the feature extracting layer in FIG. 10A, and the at least one eighth feature extracting module may correspond to the up-sampling layer in FIG. 10A.

In particular, the at least one seventh feature extracting module performs feature extraction on the input information respectively through at least two convolution processing parameters, and outputs the extracted speech feature information. The at least two convolution processing parameters include at least two of a convolution processing parameter corresponding to a receptive field between adjacent samples of a speech signal, a convolution processing parameter corresponding to a receptive field of one pitch length, and a convolution processing parameter corresponding to a receptive field of at least two pitch lengths, wherein the convolution processing parameter may include a convolution kernel size corresponding to a convolution operation.

In particular, as illustrated in FIG. 10A, the extracting the speech feature information may include: performing multi-scale feature extraction on the received speech signal by setting a stride of the multiple scale convolution operation in the feature extracting layer to be 1, so as to obtain the speech feature information. In this step, the speech receiving method does not change the scale of the signal, thus, the stride of the multiscale convolution operation in the feature extracting layer is set to be 1. In addition, the feature extracting layer reuses the design of the feature extracting layer in the speech transmitting method. In other words, the number and size of convolution operations in the feature extracting layer in the speech receiving method are the same as those in the feature extracting layer in the speech transmitting method. That is to say, the feature fusing layer in the speech receiving method reuses the design of the feature fusing layer in the speech transmitting method. This enables the speech receiving device to better recover information obtained in the processing of the speech transmitting device. Thus, in correspondence with the diagram of the down-sampling process based on AI illustrated in FIG. 3, the multiscale convolution operation in the feature extracting layer in the up-sampling process based on AI illustrated in FIG. 10A also has three convolution kernel sizes, that is, 8, 16 and 32. Meanwhile, each convolution operation in the multiscale convolution operation has two convolution operations, and each convolution operation has one convolution kernel. Thus, the speech receiving method may perform extraction on speech features by using the multiscale convolution operation having different sizes. For example, if a shape of the input data to be processed is [320,1], then since a stride is set to be 1, a shape output from the feature extracting layer is 3*[320,2].

In step S420, by using the at least one eighth feature extracting module, according to the extracted speech feature information, the low frequency feature information including the relevant information between high frequency features and low frequency features is extracted and the high frequency feature information is recovered, so as to obtain the feature information including the high frequency feature information and the low frequency feature information. The at least one eighth feature extracting module extracts the low frequency feature information from the input information respectively through at least two deconvolution processing parameters, and recovers the high frequency feature information, so as to obtain the feature information including the high frequency feature information and the low frequency feature information. The at least two convolution processing parameters include at least two of a convolution processing parameter corresponding to a receptive field between adjacent samples of a speech signal, a convolution processing parameter corresponding to a receptive field of one pitch length, and a convolution processing parameter corresponding to a receptive field of at least two pitch lengths, wherein the convolution processing parameter may include a convolution kernel size corresponding to a convolution operation.

In particular, for example, as illustrated in FIG. 10A, while obtaining the feature information including the high frequency feature information and the low frequency feature information, the speech feature is performed deconvolution by setting a stride of the multiscale convolution operation in the up-sampling layer to be 2 so as to extract the low frequency feature information from the input information and recover the high frequency feature information, so as to obtain the feature information including the high frequency feature information and the low frequency feature information. In this step, the speech receiving method needs to accomplish scale expansion of a feature and up-sampling rate recovery, thus, the speech receiving method implements the scale expansion of the feature and the up-sampling rate recovery by performing deconvolution on the data input to the up-sampling layer, so as to obtain the feature information including the high frequency feature information and the low frequency feature information, wherein the receiving method uses, in the up-sampling layer, the multiscale convolution operation of which the number and size of convolution operations are the same as those of the multiscale convolution operation in the feature extracting layer. As illustrated in FIG. 10A, if a shape of the signal output from the feature extracting layer is 3*[320,2], then a shape of the signal output from the up-sampling layer is 3*[640,2].

In step S430, the feature information including the high frequency feature information and the low frequency feature information output by the second feature extracting network is fused by using the second feature fusing network to obtain the speech signal corresponding to the feature information including the high frequency feature information and the low frequency feature information. As illustrated in FIG. 10A, a fusing processing is performed on the feature information including the high frequency feature information and the low frequency feature information by setting a stride of a single convolution operation in the feature fusing layer of the CNN to be 1, so as to obtain the output signal. In addition, the feature fusing layer reuses the design of the feature fusing layer in the speech transmitting method. In other words, the number and size of convolution operations in the feature fusing layer are the same as those in the feature fusing layer in the speech transmitting method. That is to say, the feature fusing layer in the speech receiving method reuses the design of the feature fusing layer in the speech transmitting method. Referring to FIG. 10A, the speech receiving method performs convolution processing on the feature information at different scales which includes the high frequency feature information and the low frequency feature information by using the feature fusing layer, to obtain the speech signal corresponding to the feature information including the high frequency feature information and the low frequency feature information. For example, if a shape of the signal input to the feature fusing layer is 3*[640,2], then a shape of the signal output from the feature fusing layer is [640,1].

In step S440, a speech signal corresponding to the feature information including the high frequency feature information and the low frequency feature information is output.

Although the speech receiving method based on the neural network is described by taking the CNN as an example in the above descriptions, the neural network on which the speech receiving method of the embodiment is based may also be the deep neural networks (DNN). In other words, it may implement the second feature extracting network and the second feature fusing network based on the DNN.

Figure 10B:
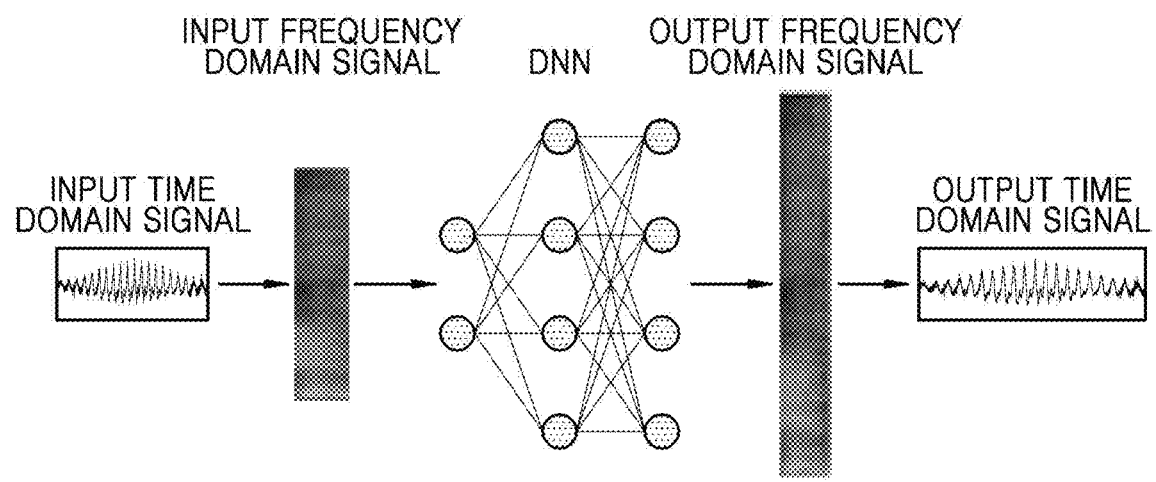
FIG. 10B is a diagram illustrating an example of the up-sampling process based on AI corresponding to the speech transmitting method illustrated in FIG. 6 according to an exemplary embodiment.

FIG. 10B is a diagram illustrating an example of the up-sampling process based on AI corresponding to the speech transmitting method illustrated in FIG. 6 according to an exemplary embodiment.

As illustrated in FIG. 10B, a low frequency speech signal is input and converted from a time domain to a frequency domain, then frequency domain information including high and low frequency information is obtained by recovering the high frequency information from the low frequency information through the DNN. Then, the frequency domain information is converted from the frequency domain to the time domain to obtain an output high frequency time domain signal.

In addition, according to the embodiments described above, the transmitting method of the speech signal may be referred to as a down-sampling method based on AI, and the receiving method of the speech signal may be referred to as an up-sampling method based on AI. While designing the down-sampling method based on AI and the up-sampling method based on AI, a joint designing may be performed.

Figure 10C:
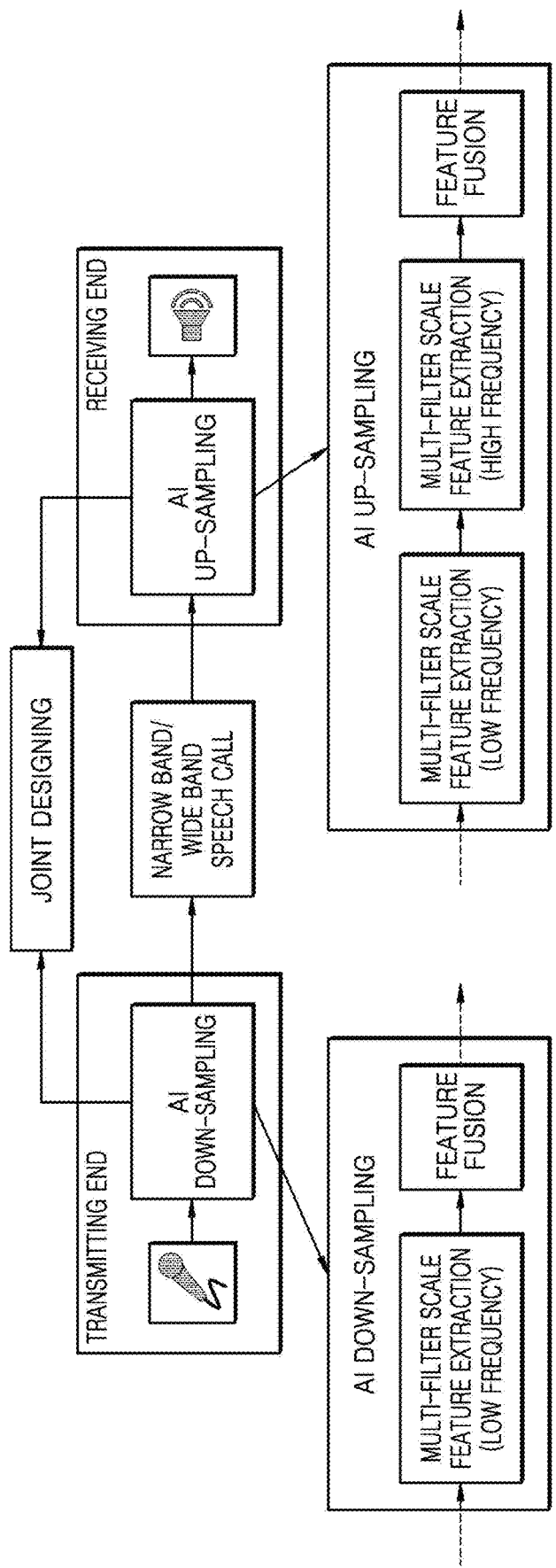
FIG. 10C is an overall diagram of a down-sampling method based on AI and an up-sampling method based on AI according to an embodiment.

FIG. 10C is an overall diagram of a down-sampling method based on AI and an up-sampling method based on AI put forward by embodiments.

As illustrated in FIG. 10C, while training the above the down-sampling method based on AI and the up-sampling method based on AI, a manner of joint training may be adopted, for example, performing joint training on the first feature extracting network, the first fusing network, the second feature extracting network, and the second feature fusing network, then an up-sampling process based on AI of the receiving end and a down-sampling process based on AI of the transmitting end may use the same filter to learn the corresponding information of high frequency features and low frequency features, thereby improving the performance by better reserving low frequency feature information and better recovering high frequency feature information. Accordingly, the high frequency feature information has a higher quality, and improves the listening effect on a user.

FIGS. 10D(a) and 10D(b) shows diagrams illustrating a contrast between the down-sampling method based on AI set forth in the embodiments and a traditional down-sampling method, wherein the figure on the top illustrates the traditional method, and the figure on the bottom illustrates the down-sampling method based on AI according to the embodiments. The figures in FIG. 10D are spectrograms in which the horizontal axis represents a time, the vertical axis represents a frequency, and the strips represent spectrum distribution of a speech signal. It can be seen from the regions in the boxes in the figures that the down-sampling method based on AI proposed in the embodiments may better reserve down-sampling information and improve speech intelligibility.

Taking an SNR of a signal domain as an evaluation index, the joint designing method in the embodiments has an increase of at least 0.9 dB in performance, compared with methods in the related art. The level of similarity in time domain between the recovered SWB signal and the input SWB signal is tested based on the SNR; the greater the SNR value, the better it is. Through a comparison of Mean Opinion Score (MOS) tests, the joint designing method in the embodiments is compared with the traditional BWE method, and the result shows that the joint designing method effectively improves a subjective test score.

Figure 11:
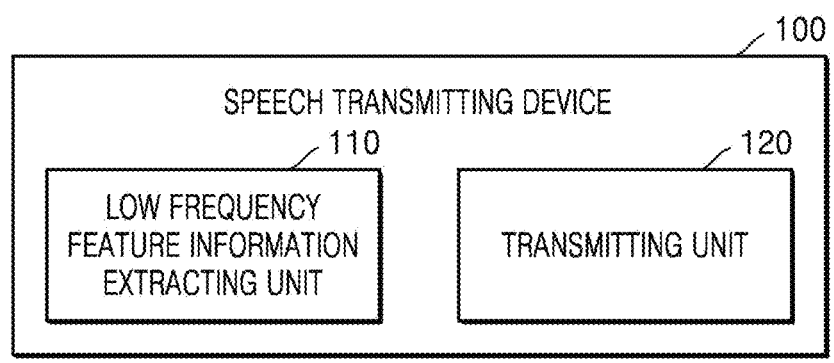
FIG. 11 is a block diagram of a speech transmitting device according to an exemplary embodiment.

FIG. 11 is a block diagram of a speech transmitting devices 100 according to an exemplary embodiment.

The speech transmitting device illustrated in FIG. 11 is a speech transmitting apparatus based on the neural network, wherein the neural network may be convolutional neural networks (CNN). That is, the speech transmitting device may be the speech transmitting device based on the speech transmitting method based on the CNN as illustrated in FIG. 3. As illustrated in FIG. 11, the speech transmitting device 100 may include a low frequency feature information extracting unit 110 and a transmitting unit 120. The low frequency feature information extracting unit 110 corresponds to the multiple filter scale feature extraction (low frequency) process in FIG. 3, and the transmitting unit 120 corresponds to the feature fusion process in FIG. 3. However, one or more embodiments are not limited thereto. The feature extracting network in the receiving method of the embodiment may also be implemented by the DNN (deep neural networks).

In order to facilitate understanding of the embodiment, the speech transmitting device of FIG. 11 will be described as follows according to the processing process of the speech transmitting method based on the CNN as illustrated in FIG. 3.

The low frequency feature information extracting unit 110 may be configured to extract low frequency feature information from an input speech signal by using a first feature extracting network.

In particular, the first feature extracting network may include at least one first feature extracting module and at least one second feature extracting module. As illustrated in FIG. 3, the first feature extracting network may correspond to the multiple convolution kernel scale feature extraction (low frequency) process in FIG. 3, the at least one first feature extracting module may correspond to a feature extracting layer in FIG. 3, and the at least one second feature extracting module may correspond to a down-sampling layer in FIG. 3.

Figure 12:
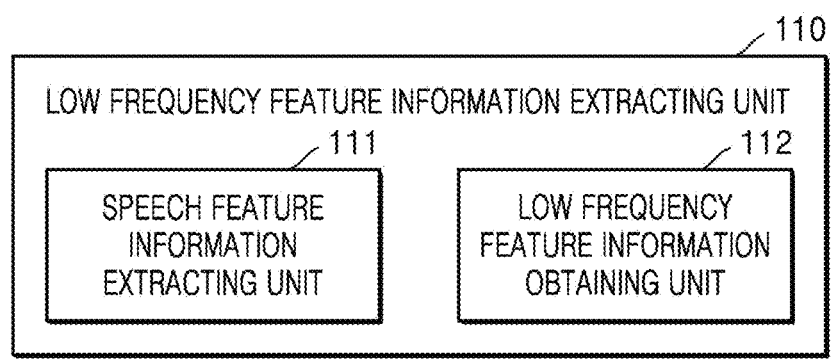
FIG. 12 is a block diagram of a low frequency feature information extracting unit according to an exemplary embodiment.

FIG. 12 is a block diagram of a low frequency feature information extracting unit according to an exemplary embodiment.

As illustrated in FIG. 12, the low frequency feature information extracting unit 110 may include a speech feature information extracting unit 111 and a low frequency feature information obtaining unit 112.

The speech feature information extracting unit 111 may be configured to extract speech feature information of the input speech signal by using the at least one first feature extracting module. The at least one first feature extracting module in the first feature extracting network may perform feature extraction on the input information respectively through at least two convolution processing parameters and output the extracted feature information. The at least two convolution processing parameters may include at least two of a first convolution processing parameter corresponding to a first receptive field between adjacent samples of a speech signal, a second convolution processing parameter corresponding to a second receptive field of one pitch length, and a third convolution processing parameter corresponding to a third receptive field of at least two pitch lengths, wherein the convolution processing parameter may include a convolution kernel size corresponding to a convolution operation.

In particular, as illustrated in FIG. 3, the speech feature information extracting unit 111 may learn high frequency features and low frequency features of a speech by learning at a high frequency sampling rate through a multiscale convolution operation in the feature extracting layer in FIG. 3, that is to say, the speech feature information includes the high frequency features and the low frequency features. In particular, in order to learn features of different high and low frequency sub-bands, the convolution operations may adopt different convolution kernel sizes, and this is because different convolution kernel sizes equal different frequency domain resolutions. The greater the convolution kernel size is, the more complicated the convolution operation, and the more accurate the relevant information that may be learned. Thus, with different convolution kernel sizes, the convolution operations may learn features of covering different frequency resolutions. Thus, in FIG. 3, the feature extracting layer performs multiscale feature extraction on the input speech signal with different convolution kernel sizes. As illustrated in FIG. 3, the feature extracting layer has three convolution kernel sizes, that is, 8, 16 and 32. Therefore, as illustrated in FIG. 4, the convolution kernels of different sizes may cover a first receptive field between adjacent samples of the input speech signal, a second receptive field of one pitch length, and a third receptive field of at least two pitch lengths. That is, a small convolution kernel size 8 may be selected to cover features at a scale of the adjacent samples; a medium convolution kernel size 16 may be selected to cover features at a scale within the same pitch; and a large convolution kernel size 32 may be selected to cover features at scale between different pitches. However, these are only examples, and it may select any convolution kernel size that may cover the receptive field of adjacent samples, the receptive field of one pitch length, and the receptive field of at least two pitch lengths.

In addition, in FIG. 3, the convolution operation of each scale in the multiscale convolution operation in the feature extracting layer includes two convolution operations, each convolution operation includes one convolution kernel, and a stride of the convolution operation of each scale in the multiscale convolution operation in the feature extracting layer is 1, so that a signal scale is not changed, for example, if a shape of an input speech signal is [640,1], wherein 640 represents a length of the input speech signal, and 1 represents the number of the speech, then a shape of the output from the feature extracting layer is 3*[640,2], wherein 3 represents that the output of the feature extracting layer is data of three scales, that is, a shape of the signal output from the convolution operation of each scale in the multiscale convolution operation in the feature extracting layer is [640,2].

The low frequency feature information obtaining unit 112 may obtain the low frequency feature information according to the extracted speech feature information by using the at least one second feature extracting module.

In particular, the low frequency feature information obtaining unit 112 may perform feature extraction on input information respectively through at least two convolution processing parameters, and output the extracted feature information. That is, the at least one second feature extracting module in the first feature extracting network may perform feature extraction on the input speech feature information respectively through at least two convolution processing parameters, and output the extracted feature information. The at least two convolution processing parameters include at least two of a convolution processing parameter corresponding to a receptive field between adjacent samples of a speech signal, a convolution processing parameter corresponding to a receptive field of one pitch length, and a convolution processing parameter corresponding to a receptive field of at least two pitch lengths, wherein the convolution processing parameter may include a convolution kernel size corresponding to a convolution operation. Since the detailed description of the convolution processing parameter have been provided above with reference to FIG. 3, the description thereof will not be repeated here.

As illustrated in FIG. 3, the low frequency feature information extracting unit 110 performs convolution on the speech feature by setting strides of the convolution operations in the down-sampling layer to be 2, so as to obtain the low frequency feature information including relevant information between the high frequency features and the low frequency features. In particular, the low frequency feature information extracting unit 110 may perform convolution and sampling rate conversion on the extracted speech feature by using the multiscale convolution operation in the down-sampling layer. In other words, the low frequency feature information extracting unit 110 may perform the convolution and the sampling rate conversion by performing convolution on the speech feature through the multiscale convolution operation in the down-sampling layer, to fuse the relevant information between the high low frequency features and the low frequency features into the low frequency feature information so as to obtain the low frequency feature information including the relevant information.

In addition, in the example illustrated in FIG. 3, the low frequency feature information extracting unit 110 may use, in the at least one second feature extracting module, a convolution processing parameter that is the same as the convolution processing parameter used in the at least one first feature extracting module. That is, the low frequency feature information extracting unit 110 uses, in the down-sampling layer, the multiscale convolution operation of which the number and size of convolution operations are the same as those of the multiscale convolution operation in the feature extracting layer. For example, as illustrated in FIG. 3, the multiscale convolution operation in the down-sampling layer has three convolution kernel sizes, for example, 8, 16 and 32, each convolution operation in the multiscale convolution operation has two convolution operations, and each convolution operation is implemented by one convolution kernel. Thus, as illustrated in FIG. 3, in order to perform convolution and sampling rate conversion through the multiscale convolution operation in the down-sampling layer, the stride of each of convolution operation in the multiscale convolution operation in the down-sampling layer is set to be 2 in the example illustrated in FIG. 3. Thus, if a shape of the signal output from the feature extracting layer is 3*[640,2], then a shape of the signal output from the down-sampling layer is 3*[320,2]. Here, the reason for setting the stride of the convolution operation to be 2 is that a frequency of the SWB is two times that of the WB.

In addition, although the low frequency feature information extracting unit 110 uses, in the at least one second feature extracting module, the convolution processing parameters that are the same as the convolution processing parameters used in the at least one first feature extracting module, the embodiment is not limited thereto, and the at least one second feature extracting module may also use convolution processing parameters that are different from the convolution processing parameters used in the at least one first feature extracting module. In this case, a form of speech feature information suitable for being processed by the at least one second feature extracting module can be obtained by fusing speech feature information extracted by the at least one first feature extracting module, for example, assume that the multiscale convolution operation in the down-sampling layer in FIG. 3 has three convolution kernel sizes, that is, 8, 16 and 32, and the multiscale convolution operation in the down-sampling layer has two convolution kernel sizes, that is, 16 and 32, in this case, the feature extracting layer may fuse speech feature information output by the convolution operation having a convolution kernel size of 8, so as to obtain speech feature information in the same form as speech feature information output by the convolution operation having a convolution kernel size of 16 or 32.

Referring to FIG. 11, the transmitting unit 120 may be configured to transmit a speech signal corresponding to the low frequency feature information to a receiving end.

In particular, the transmitting unit 120 may be configured to transmit the speech signal corresponding to the low frequency feature information to the receiving end through operations of fusing all low frequency feature information output by the first feature extracting network by using the first feature fusing network to obtain the speech signal corresponding to the low frequency feature information, and transmitting the speech signal corresponding to the low frequency feature information to the receiving end. In the example illustrated in FIG. 3, the first fusing network corresponds to the feature fusion process in FIG. 3. In particular, after the low frequency feature information extracting unit 110 obtains the low frequency feature information at different scales through the down-sampling layer, the transmitting unit 120 may perform convolution processing on the low frequency feature information at the different scales obtained through the down-sampling layer by setting a stride of a single convolution operation in the feature fusing layer to be 1, so as to obtain the speech signal corresponding to the low frequency feature information. As illustrated in FIG. 3, the low frequency feature information extracting unit 110 may obtain the low frequency feature information at three scales through the down-sampling layer. Hereafter, the transmitting unit 120 may perform convolution processing on the low frequency feature information at three different scales through the feature fusing layer to obtain the speech signal corresponding to the low frequency feature information that needs to be output, and transmit the speech signal to the receiving end, for example, if a shape of the signal output by the down-sampling layer is 3*[320,2], then a shape of the signal output from the feature fusing layer is [320, 1].

In an actual application, the speech transmitting device 100 may be another speech receiving device, thus, the speech transmitting device 100 may also include: a receiving unit configured to receive a speech signal transmitted by the receiving end; a high frequency feature information recovering unit configured to extract low frequency feature information from the received speech signal and recover high frequency feature information, by using a second feature extracting network; and an outputting unit configured to output a speech signal including the low frequency feature information and the high frequency feature information. Hereafter, it will be described in details when the speech receiving device is described.

In addition, although the speech transmitting device 100 based on the neural network is described taking the CNN as an example in the above descriptions, the neural network on which the speech transmitting device 100 according to an embodiment is based may also be the deep neural networks (DNN). In other words, the first feature extracting network and the first feature fusing network may be implemented based on the DNN. As illustrated in FIG. 5, a high frequency speech signal is input and converted from a time domain to a frequency domain, then a conversion from a high frequency to a low frequency is performed on information in the frequency domain through the DNN to obtain low frequency information in the frequency domain, and at last, the low frequency information in the frequency domain is converted from the frequency domain to the time domain to obtain an output low frequency signal in the time domain.

Compared with the traditional speech transmitting devices, the above described speech transmitting device 100 may reserve low frequency features of the input speech signal completely, and fuse high frequency features into the low frequency features, wherein the feature extracting layer may fully reserve more information of the input speech signal to make the low frequency information more complete. The down-sampling layer may fuse the high frequency features of the speech signal into the low frequency features so as to make the high frequency features be reconstructed better in a speech receiving device. In addition, since the traditional down-sampling method only uses a simple filter of a single scale, it may lose low frequency information of a speech signal in the process of sampling rate conversion, so that it is hard to recover the complete low frequency features in the speech receiving apparatus, and also hard to better recover the high frequency features in the up-sampling process. These two technologies adopted in the embodiments will improve articulation of a speech, thereby improving a subjective experience of a user.

Figure 13:
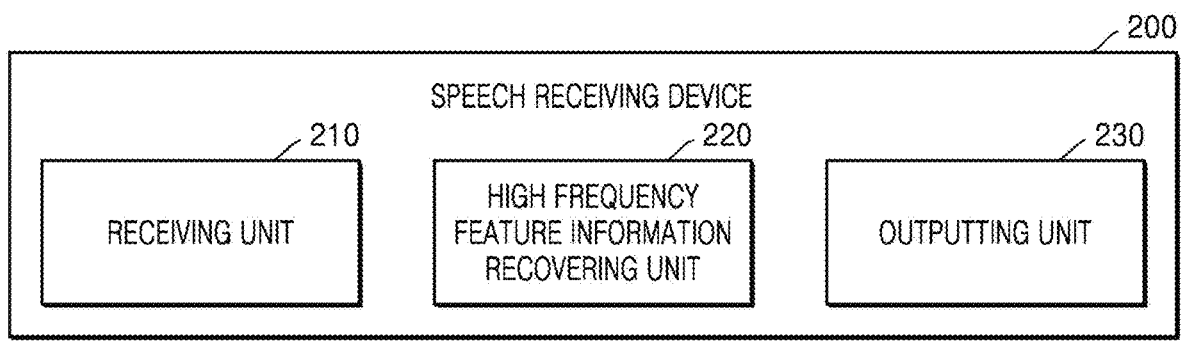
FIG. 13 is a block diagram of a speech receiving device according to an exemplary embodiment.

FIG. 13 is a block diagram of a speech receiving device 200 according to an exemplary embodiment.

As illustrated in FIG. 13, the speech receiving device 200 may include a receiving unit 210, a high frequency feature information recovering unit 220 and an outputting unit 230.

The receiving unit 210 may be configured to receive a speech signal transmitted by a transmitting end. The high frequency feature information recovering unit 220 may be configured to, by using a second feature extracting network, extract low frequency feature information from the received speech signal and recover high frequency feature information. The outputting unit 230 may output a speech signal including the low frequency feature information and the high frequency feature information.

The speech receiving device illustrated in FIG. 13 is the speech receiving device 200 based on a neural network, wherein the neural network may be convolutional neural networks (CNN), that is to say, the speech receiving device 200 may correspond to the speech receiving method based on CNN as illustrated in FIG. 8. As illustrated in FIG. 8, the speech receiving process includes three processes: a multi-filter scale feature extraction (low frequency) process, a multi-filter scale feature extraction (high frequency) process, and a feature fusion process, wherein the multi-filter scale feature extraction may also be referred to as multiple convolution kernel scale feature extraction. The multiple convolution kernel scale feature extraction (low frequency) process and the multiple convolution kernel scale feature extraction (high frequency) process may correspond to the high frequency feature information recovering unit 220, and the feature fusion process may correspond to the outputting unit 230. However, one or more embodiments are not limited thereto. The feature extracting network in the speech receiving device of the embodiment may also be implemented by the DNN (deep neural networks).

In one embodiment, the speech receiving device 200 may also include a preprocessing unit, wherein the preprocessing unit may be configured to perform data replication on the received speech signal so as to expand data scale of the received speech signal, before the extracting the low frequency feature information from the received speech signal and recovering the high frequency feature information by using the second feature extracting network. The preprocessing unit corresponds to the preprocessing procedure in FIG. 8. The preprocessing unit may accomplish the scale expansion by performing spaced and repeated replication on the received data, for example, if the received data is [0,1,2,3,4], then the expanded data is [0,0,1,1,2,2,3,3,4,4], and this step may perform a symmetric expansion from the low frequency information in the frequency domain to the high frequency information in frequency domain.

The high frequency feature information recovering unit 220 may be configured to extract the low frequency feature information from the received speech signal and recover the high frequency feature information by using the second feature extracting network through operations of extracting the low frequency feature information from the received speech signal by using a low frequency feature extracting network in the second feature extracting network, wherein the low frequency feature information includes relevant information between high frequency features and low frequency features.

In particular, the low frequency feature extracting network includes at least one third feature extracting module and at least one fourth feature extracting module. As illustrated in FIG. 8, the second feature extracting network may correspond to the multiple convolution kernel scale feature extraction (low frequency) process and the multiple convolution kernel scale feature extraction (high frequency) process in FIG. 8, the low frequency extracting network may correspond to the multiple convolution kernel scale feature extraction (low frequency) process in FIG. 8, the at least one third feature extracting module may correspond to the feature extracting layer in FIG. 8, and the at least one fourth feature extracting module may correspond to the down-sampling layer in FIG. 8. The low frequency feature extracting network may include one or more feature extracting layers, and may also include one or more down-sampling layers. In particular, the high frequency feature information recovering unit 220 may be configured to extract the low frequency feature information from the received speech signal by using the low frequency feature extracting network in the second feature extracting network through an operation of: extracting speech feature information of the received speech signal by using the at least one third feature extracting module, wherein the at least one third feature extracting module in the second feature extracting network performs feature extraction on the input information respectively through at least two convolution processing parameters, and outputs the extracted feature information. The at least two convolution processing parameters include at least two of a convolution processing parameter corresponding to a receptive field between adjacent samples of a speech signal, a convolution processing parameter corresponding to a receptive field of one pitch length, and a convolution processing parameter corresponding to a receptive field of at least two pitch lengths, wherein the convolution processing parameter may include a convolution kernel size corresponding to a convolution operation.

In particular, as illustrated in FIG. 8, the high frequency feature information recovering unit 220 may perform multiscale feature extraction on the expanded speech signal by setting a stride of the multiple scale convolution operation in the feature extracting layer to be 1, so as to obtain the speech feature information. In this processing, the high frequency feature information recovering unit 220 does not change a scale of the signal, thus, the stride of the multiscale convolution operation in the feature extracting layer is set to be 1. In addition, the feature extracting layer reuses the design of the feature extracting layer in the speech transmitting method. In other words, the number and size of convolution operations in the feature extracting layer of the speech receiving device 200 are the same as those in the feature extracting layer of the speech transmitting device 100. That is to say, the feature extracting layer in the speech receiving device 200 reuses the design of the feature extracting layer in the speech transmitting device 100. This enables the up-sampling process based on AI of the speech receiving device 200 to better recover information obtained in the down-sampling process based on AI of the speech transmitting device 100. Thus, in correspondence with the diagram of the down-sampling process based on AI illustrated in FIG. 3, the multiscale convolution operation in the feature extracting layer in the up-sampling process based on AI illustrated in FIG. 8 also has three convolution kernel sizes, that is, 8, 16 and 32. Meanwhile, the convolution operation of each scale in the multiscale convolution operation has two convolution operations. Thus, the speech receiving device 200 may perform extraction on speech feature by using the multiscale convolution operation having different sizes. For example, if a shape of the input expanded speech signal is [640,1], then since the stride of the multiscale convolution operation in the feature extracting layer is set to be 1, a shape output from the feature extracting layer is 3*[640,2]. The convolution operation of each scale in the feature extracting layer may also include one convolution operation, or more than two convolution operations.

In addition, the high frequency feature information recovering unit 220 may be configured to extract the low frequency feature information from the received speech signal by using the low frequency feature extracting network in the second feature extracting network also through operations of: obtaining the low frequency feature information according to the extracted speech feature information by using the at least one fourth feature extracting module, wherein the at least one fourth feature extracting module in the second feature extracting network performs feature extraction on the input information respectively through at least two convolution processing parameters, and outputs the extracted feature information. The at least two convolution processing parameters include at least two of a convolution processing parameter corresponding to a receptive field between adjacent samples of a speech signal, a convolution processing parameter corresponding to a receptive field of one pitch length, and a convolution processing parameter corresponding to a receptive field of at least two pitch lengths, wherein the convolution processing parameter may include a convolution kernel size corresponding to a convolution operation.

In particular, for example, as illustrated in FIG. 8, while obtaining the low frequency feature information, the speech feature may be performed convolution by setting a stride of the multiscale convolution operation in the down-sampling layer to be 2 so as to obtain the low frequency feature information.

In addition, the down-sampling layer reuses the design of the down-sampling layer in the speech transmitting device 100. In other words, the number and size of convolution operations in the down-sampling layer of the speech receiving device 200 are the same as those in the down-sampling layer of the speech transmitting device 100. That is, the down-sampling layer in the speech receiving device 200 reuses the design of the down-sampling layer in the speech transmitting device 100. This enables the up-sampling process based on AI of the speech receiving device 200 to better recover information obtained in the down-sampling process based on AI of the speech transmitting device 100. Similarly, the speech receiving device 200 may use, in the down-sampling layer, the multiscale convolution operation of which the number and size of convolution operations are the same as those of the multiscale convolution operation in the feature extracting layer. For example, as illustrated in FIG. 8, the multiscale convolution operation in the down-sampling layer has three convolution kernel sizes, that is, 8, 16 and 32, each kind of convolution operation in the multiscale convolution operation has two convolution operations, and each convolution operation has one convolution kernel. Thus, as illustrated in FIG. 8, in order to perform convolution through the multiscale convolution operation in the down-sampling layer so as to perform sampling rate conversion, a stride of each kind of convolution operation in the multiscale convolution operation in the down-sampling layer is set to be 2 in the example illustrated in FIG. 8. Thus, if a shape of the signal output from the feature extracting layer is 3*[640,2], then a shape of the signal output from the down-sampling layer is 3*[320,2]. Here, the reason for setting the stride of the convolution operation to be 2 is that a frequency of the SWB is two times that of the WB.

The feature extracting layer and the down-sampling layer in the up-sampling process based on AI of the speech receiving device 200 in the above depictions with reference to FIG. 8 and those in the down-sampling process based on AI of the speech transmitting device 100 use the same size and number of convolution operations on the same signal scale, so that the up-sampling process based on AI of the speech receiving device 200 and the down-sampling process based on AI of the speech transmitting device 100 may extract low frequency information and recover a signal from the information according to the same way of operation. Such operations enable the up-sampling process based on AI of the speech receiving device 200 to better recover information obtained in the down-sampling process based on AI of the speech transmitting device 100.

The high frequency feature information recovering unit 220 may be configured to extract the low frequency feature information from the received speech signal and recover the high frequency feature information by using the second feature extracting network also through operations of: by using a high frequency feature extracting network in the second feature extracting network, recovering the high frequency feature information according to the low frequency feature information and performing fusing processing on the high frequency feature information and the low frequency feature information, so as to obtain feature information including the high frequency feature information and the low frequency feature information.

In particular, the high frequency feature extracting network includes at least one fifth feature extracting module and at least one sixth feature extracting module. As illustrated in FIG. 8, the high frequency extracting network may correspond to the multiple convolution kernel scale feature extraction (high frequency) process in FIG. 8, the at least one fifth feature extracting module may correspond to the bottleneck layer in FIG. 8 or a convolution layer in the up-sampling layer in FIG. 8, and the at least one sixth feature extracting module may correspond to a joining layer in the up-sampling layer in FIG. 8. In particular, the high frequency feature information recovering unit 220 may be configured to recover the high frequency feature information according to the low frequency feature information and perform fusing processing on the high frequency feature information and the low frequency feature information by using the high frequency feature extracting network in the second feature extracting network through operations of: recovering the high frequency feature information according to the low frequency feature information by using the at least one fifth feature extracting module.

The at least one fifth feature extracting module in the second feature extracting network performs feature extraction on the input information respectively through at least two convolution processing parameters, and outputs the extracted feature information. The at least two convolution processing parameters include at least two of a convolution processing parameter corresponding to a receptive field between adjacent samples of a speech signal, a convolution processing parameter corresponding to a receptive field of one pitch length, and a convolution processing parameter corresponding to a receptive field of at least two pitch lengths, wherein the convolution processing parameter may include a convolution kernel size corresponding to a convolution operation.

In particular, as illustrated in FIG. 8, the high frequency feature information recovering unit 220 may perform convolution on the low frequency feature information by setting a stride of the multiscale convolution operation in the bottleneck layer to be 2, so as to obtain the convolved feature information. The low frequency feature information obtained by the down-sampling layer is actually the low frequency feature information to which the relevant information between the high frequency features and the low frequency features are fused, and the bottleneck layer may further fuse the low frequency feature information including the relevant information. The bottleneck layer may be implemented through bottleneck convolution, for example, performing processing on the multiscale low frequency feature information output from the down-sampling layer by setting a stride of the multiscale convolution operation in the bottleneck layer to be 2, wherein the multiscale convolution operation of which the number and size of convolution operations are the same as those of the multiscale convolution operation in the down-sampling layer may be used in the bottleneck layer. As illustrated in FIG. 8, the convolution operation of each scale in the multiscale convolution operation in the bottleneck layer includes two convolution operations, and as illustrated in FIG. 8, a convolution kernel size may be 8, 16 and 32. Thus, as illustrated in FIG. 8, if a shape of the signal output from the down-sampling layer is 3*[320, 2], then a shape of the signal output from the bottleneck layer is 3*[160, 2].

The convolution operation of each scale in the feature extracting layer may also include one convolution operation, or more than two convolution operations.

In addition, as illustrated in FIG. 8, the high frequency feature information recovering unit 220 may perform convolution on the low frequency feature information by setting a stride of the multiscale convolution operation in the up-sampling layer to be 1 and arrange the convolution result, so as to obtain the high frequency feature information. The high frequency feature information recovering unit 220 may use, in the up-sampling layer, the multiscale convolution operation of which the number and size of convolution operations are the same as those of the multiscale convolution operation in the bottleneck layer, for example, as illustrated in FIG. 8, each convolution operation in the multiscale convolution operation of the convolution layer in the up-sampling layer includes four convolution operations, each convolution operation has one convolution kernel, and as illustrated in FIG. 8, the convolution size may be 8, 16 and 32. In the process, the high frequency feature information recovering unit 220 performs convolution processing on the low frequency feature information output by the bottleneck layer by setting a stride of the multiscale convolution operation of the convolution layer in the up-sampling layer to be 1. For example, if a shape of the signal output from the bottleneck layer is 3*[160,2], then the convolution result is 3*[160,4], and this step of convolution processing fuses information obtained by the bottleneck layer. Hereafter, the up-sampling layer rearranges the convolution result, so as to further obtain the rearranged high frequency feature information, for example, if the convolution result is 3*[160,4], then the rearranged high frequency feature information is 3*[320,2], wherein the method adopted in the rearrangement is a cross arranging method, for example, as illustrated in FIG. 8, under each of convolution operation, the convolution result is four groups of data (the four groups of data indicated by 701 in FIG. 8), e.g., a first group [a1, a2, a3, a4 . . . an], a second group [b1, b2, b3, b4 . . . bn], a third group [c1, c2, c3, c4 . . . cn], and a fourth group [d1, d2, d3, d4 . . . dn], and then the rearranged results are [a1, b1, a2, b2, a3, b3, a4, b4 . . . an, bn] and [c1, d1, c2, d2, c3, d3, c4, d4 . . . cn, dn]. That is to say, the data in the first and second groups are arranged crosswise, and the data in the third and fourth groups are arranged crosswise. However, the method adopted in the rearrangement is only an example, and the embodiments are not limited thereto.

Through the above operations, the high frequency feature information recovering unit 220 may recover the high frequency feature information.

In the embodiments, the low frequency feature information of the speech signal transmitted by the transmitting end also includes the relevant information (or relationship information) between the high frequency features and the low frequency features, and with the use of the relevant information, the receiving end may learn the relation between the high frequency features and the low frequency features and may better recover the high frequency features according to the low frequency features.

In addition, the high frequency feature information recovering unit 220 may be configured to recover the high frequency feature information according to the low frequency feature information and perform fusing processing on the high frequency feature information and the low frequency feature information by using the high frequency feature extracting network in the second feature extracting network also through operations of performing fusing processing on the high frequency feature information and the low frequency feature information extracted by the corresponding fourth feature extracting module, by using the at least one sixth feature extracting module, to obtain the feature information including the high frequency feature information and the low frequency feature information, For the input high frequency feature information respectively corresponding to at least two convolution processing parameters, the at least one sixth feature extracting module performs fusing processing on the high frequency feature information and the low frequency feature information extracted by the corresponding fourth feature extracting module according to corresponding convolution processing parameters respectively, and outputs the feature information including the high frequency feature information and the low frequency feature information. The at least two convolution processing parameters include at least two of a convolution processing parameter corresponding to a receptive field between adjacent samples of a speech signal, a convolution processing parameter corresponding to a receptive field of one pitch length, and a convolution processing parameter corresponding to a receptive field of at least two pitch lengths, wherein the convolution processing parameter may include a convolution kernel size corresponding to a convolution operation.

In particular, as illustrated in FIG. 8, it may obtain the data including the high and low frequency information by joining the high frequency feature information and the low frequency feature information. Referring to FIG. 8, the feature information including the high frequency feature information and the low frequency feature information at different scales may be obtained by joining the high frequency feature information output by the convolution layer in the up-sampling layer and the low frequency feature information output by the convolution processing in the down-sampling layer. For example, if a shape of the signal output by the convolution layer in the up-sampling layer is 3*[320,2], and a shape of the signal output by the convolution processing in the down-sampling layer is 3*[320,2], then the result from the joining is 3*[640,2]. Wherein this step simply joins the high frequency feature information in front of the low frequency feature information to obtain the feature information including the high frequency feature information and the low frequency feature information.

The outputting unit 230 may fuse the feature information including the high frequency feature information and the low frequency feature information output by the second feature extracting network, by using the second feature fusing network, to obtain the speech signal corresponding to the feature information including the high frequency feature information and the low frequency feature information, and output the speech signal. As illustrated in FIG. 8, the feature information including the high frequency feature information and the low frequency feature information is performed fusing processing by setting a stride of a single convolution operation in the feature fusing layer of the CNN to be 1, so as to obtain the output signal. In addition, the feature fusing layer reuses the design of the feature fusing layer in the speech transmitting method. In other words, the number and size of convolution operations in the feature fusing layer are the same as those in the feature fusing layer in the speech transmitting device 100. That is to say, the feature fusing layer in the speech receiving device 200 reuses the design of the feature fusing layer in the speech transmitting method. Referring to FIG. 8, the speech receiving device 200 performs convolution processing on the feature information including the high frequency feature information and the low frequency feature information at different scales by using the feature fusing layer to obtain the speech signal corresponding to the feature information including the high frequency feature information and the low frequency feature information. For example, if a shape of the signal input to the feature fusing layer is 3*[640,2], then a shape of the signal output from the feature fusing layer is [640,1].

Compared with the traditional down-sampling methods, the down-sampling method according to an embodiment may better reserve information of the down-sampling, and improve speech intelligibility. In addition, the method of jointly designing up-sampling and down-sampling may effectively improve an SNR value and a POLQA test result.

In addition, in another embodiment, the speech receiving device 200 may not include the above described preprocessing unit, but include the receiving unit 210, the high frequency feature information recovering unit 220 and the outputting unit 230. In this case, the high frequency feature information recovering unit 220 may be configured to extract the low frequency feature information from the received speech signal and recover the high frequency feature information by using the second feature extracting network through operations of: extracting the speech feature information of the received speech signal by using the at least one seventh feature extracting module, wherein the at least one seventh feature extracting network is included in the second feature extracting network. In addition, the second feature extracting network also includes at least one eighth feature extracting module. As illustrated in FIG. 10A, the second feature extracting network may correspond to the multiple convolution kernel scale feature extraction (high frequency) process in FIG. 10A, and the at least one seventh feature extracting module may correspond to the feature extracting layer in FIG. 10A, and the at least one eighth feature extracting module may correspond to the up-sampling layer in FIG. 10A.

In particular, the at least one seventh feature extracting module performs feature extraction on the input information respectively through at least two convolution processing parameters, and outputs the extracted speech feature information. The at least two convolution processing parameters include at least two of a convolution processing parameter corresponding to a receptive field between adjacent samples of a speech signal, a convolution processing parameter corresponding to a receptive field of one pitch length, and a convolution processing parameter corresponding to a receptive field of at least two pitch lengths, wherein the convolution processing parameter may include a convolution kernel size corresponding to a convolution operation.

In particular, as illustrated in FIG. 10A, the high frequency feature information recovering unit 220 may perform multiscale feature extraction on the received speech signal by setting a stride of the multiple scale convolution operation in the feature extracting layer to be 1, so as to obtain the speech feature information. In the process, the speech receiving device 200 does not change a scale of the signal, thus, the stride of the multiscale convolution operation in the feature extracting layer is set to be 1. In addition, the feature extracting layer reuses the design of the feature extracting layer in the speech transmitting device 100. In other words, the number and size of convolution operations in the feature extracting layer in the speech receiving device 200 are the same as those in the feature extracting layer in the speech transmitting device 100. That is to say, the feature fusing layer in the speech receiving device 200 reuses the design of the feature fusing layer in the speech transmitting device 100. This enables the speech receiving device 200 to better recover information obtained by the speech transmitting device 200. Thus, in correspondence with the diagram of the down-sampling process based on AI as illustrated in FIG. 3, the multiscale convolution operation in the feature extracting layer in the up-sampling process based on AI as illustrated in FIG. 10A also has three convolution kernel sizes, that is, 8, 16 and 32. Meanwhile, each convolution operation in the multiscale convolution operation has two convolution operations, and each convolution operation has one convolution kernel. Thus, the speech receiving device 200 may perform extraction on speech feature by using the multiscale convolution operation having different sizes. For example, if a shape of the input data to be processed is [320,1], then since a stride is set to be 1, a shape output from the feature extracting layer is 3*[320,2].

The high frequency feature information recovering unit 220 may be configured to extract the low frequency feature information from the received speech signal and recover the high frequency feature information also by using the second feature extracting network through operations of: by using the at least one eighth feature extracting module, extracting low frequency feature information including relevant information between high frequency features and low frequency features according to the extracted speech feature information, and recovering high frequency feature information, so as to obtain the feature information including the high frequency feature information and the low frequency feature information. The at least one eighth feature extracting module extracts the low frequency feature information from the input information respectively through at least two deconvolution processing parameters, and recovers the high frequency feature information, so as to obtain the feature information including the high frequency feature information and the low frequency feature information. The at least two convolution processing parameters include at least two of a convolution processing parameter corresponding to a receptive field between adjacent samples of a speech signal, a convolution processing parameter corresponding to a receptive field of one pitch length, and a convolution processing parameter corresponding to a receptive field of at least two pitch lengths, wherein the convolution processing parameter may include a convolution kernel size corresponding to a convolution operation.

In particular, as illustrated in FIG. 8, while the high frequency feature information recovering unit 220 obtains the feature information including the high frequency feature information and the low frequency feature information, the high frequency feature information recovering unit 220 may perform deconvolution on the speech feature by setting a stride of the multiscale convolution operation in the up-sampling layer to be 2 so as to extract the low frequency feature information from the input information, and recover the high frequency feature information, so as to obtain the feature information including the high frequency feature information and the low frequency feature information. In this process, the speech receiving device 200 needs to accomplish scale expansion of a feature and up-sampling rate recovery, thus, the speech receiving device 200 implements the scale expansion of the feature and the up-sampling recovery by performing deconvolution on the data input to the up-sampling layer, so as to obtain the feature information including the high frequency feature information and the low frequency feature information, wherein the speech receiving device 200 uses, in the up-sampling layer, the multiscale convolution operation of which the number and size of convolution operations are the same as those of the multiscale convolution operation in the feature extracting layer. As illustrated in FIG. 10A, if a shape of the signal output from the feature extracting layer is 3*[320,2], then a shape of the signal output from the up-sampling layer is 3*[640,2].

The outputting unit 230 may be configured to output the speech signal including the low frequency feature information and the high frequency feature information through operations of: fusing the feature information including the high frequency feature information and the low frequency feature information output by the second feature extracting network by using the second feature fusing network to obtain the speech signal corresponding to the feature information including the high frequency feature information and the low frequency feature information, and output the speech signal. As illustrated in FIG. 10A, the outputting unit 230 may perform fusing processing on the feature information including the high frequency feature information and the low frequency feature information by setting a stride of a single convolution operation in the feature fusing layer of the CNN to be 1, so as to obtain the speech signal. In addition, the feature fusing layer reuses the design of the feature fusing layer in the speech transmitting device 100. In other words, the number and size of convolution operations in the feature fusing layer are the same as those in the feature fusing layer in the speech transmitting method. That is to say, the feature fusing layer in the speech receiving device 200 reuses the design of the feature fusing layer in the speech transmitting method. Referring to FIG. 10A, the speech receiving device 200 performs convolution processing on the feature information including the high frequency feature information and the low frequency feature information at different scales by using the feature fusing layer to obtain the speech signal corresponding to the feature information including the high frequency feature information and the low frequency feature information. For example, if a shape of the signal input to the feature fusing layer is 3*[640,2], then a shape of the signal output from the feature fusing layer is [640,1].

Figure 14:
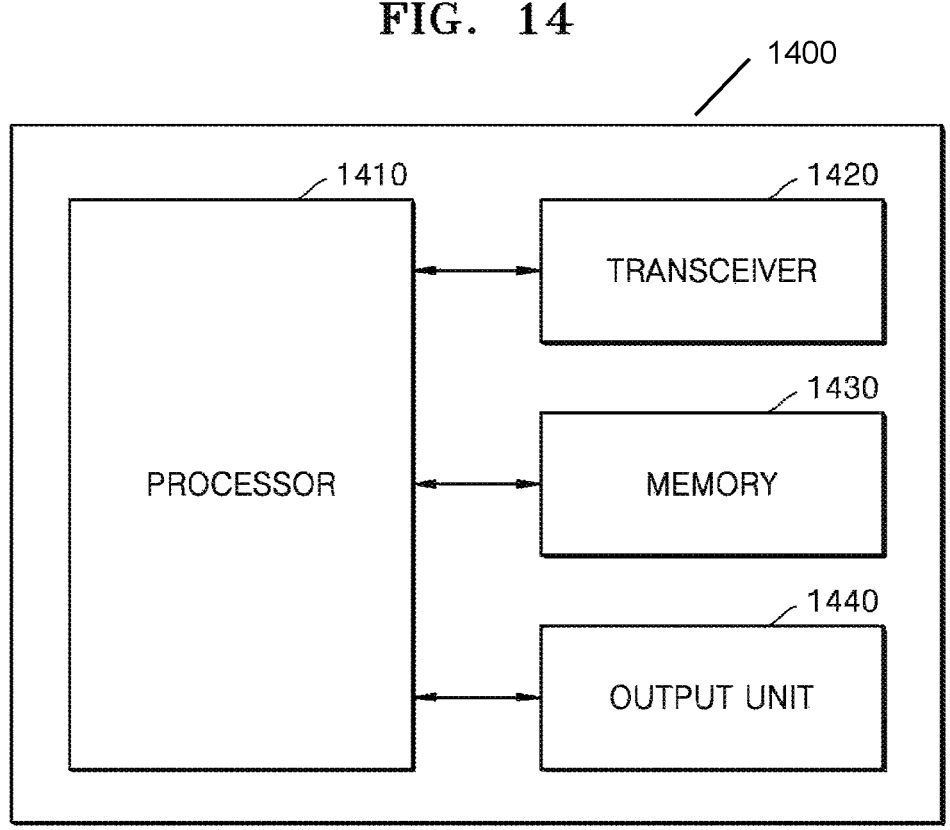
FIG. 14 is a block diagram of an apparatus for transmitting speech signal according to an exemplary embodiment.

FIG. 14 is a block diagram of an apparatus for transmitting speech signal according to an exemplary embodiment.

Referring to the FIG. 14, the apparatus 1400 for transmitting a speech signal may include a processor 1410, a transceiver 1420, a memory 1430, and an output unit 1440. However, the apparatus 1400 for transmitting a speech signal may include more or less components than those illustrated in FIG. 14. In addition, the processor 1410, the transceiver 1420, the memory 1430, and output unit 1440 may be implemented as a single chip according to an embodiment.

The apparatus 1400 for transmitting a speech signal may correspond to the another apparatus for transmitting a speech signal as described above. For example, the apparatus 1400 for transmitting a speech signal may correspond to the speech transmitting device 100 illustrated in FIG. 11.

The aforementioned components will now be described in detail.

The processor 1410 may include one or more processors or other processing devices that control the function, process, and/or method according to the embodiments. Operation of the apparatus 1400 for transmitting a speech signal may be implemented by the processor 1410.

The transceiver 1420 may include a RF transmitter for up-converting and amplifying a transmitted signal, and a RF receiver for down-converting a frequency of a received signal. However, according to another embodiment, the transceiver 1420 may be implemented by more or less components.

The transceiver 1420 may be connected to the processor 1410 and transmit and/or receive a signal. The signal may include control information and data. In addition, the transceiver 1420 may receive the signal through a wireless channel and output the signal to the processor 1410. The transceiver 1420 may transmit a signal output from the processor 1410 through the wireless channel or network.

The memory 1430 may store the control information or the data included in a signal obtained by the apparatus 1400 for transmitting a speech signal. The memory 1430 may be connected to the processor 1410 and store at least one instruction or a protocol or a parameter for performing the function, process, and/or method according to the embodiments. The memory 2130 may include read-only memory (ROM) and/or random access memory (RAM) and/or hard disk and/or CD-ROM and/or DVD and/or other storage devices.

The output unit 1440 may be connected to the processor 1410 and output a speech signal. The speech signal may be a fused speech signal comprising the low frequency feature information of the received speech signal from a sender and the recovered high frequency feature information of the received speech signal from a sender.

Figure 15:
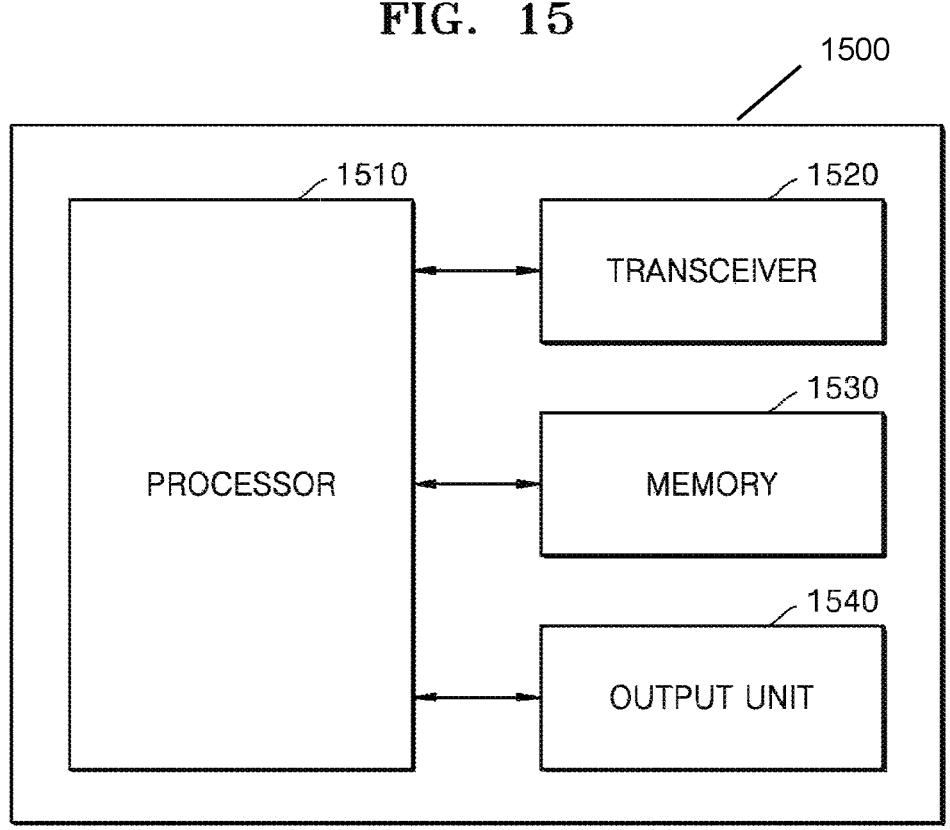
FIG. 15 is a block diagram of an apparatus for receiving speech signal according to an exemplary embodiment.

FIG. 15 is a block diagram of an apparatus for receiving speech signal according to an exemplary embodiment.

Referring to the FIG. 15, the apparatus 1500 for receiving a speech signal 1500 may include a processor 1510, a transceiver 1520, a memory 1530, and an output unit 1540. However, the apparatus 1500 for receiving a speech signal may include more or less components than those illustrated in FIG. 15. In addition, the processor 1510 and the transceiver 1520, the memory 1530, and output unit 1540 may be implemented as a single chip according to another embodiment.

The apparatus 1500 for receiving a speech signal may correspond to another apparatus for receiving a speech signal as described above. For example, the apparatus 1500 for receiving a speech signal may correspond to the speech receiving device 200 illustrated in FIG. 13.

The aforementioned components will now be described in detail.

The processor 1510 may include one or more processors or other processing devices that control the proposed function, process, and/or method. Operation of the apparatus 1500 for receiving a speech signal may be implemented by the processor 1510.

The transceiver 1520 may include a RF transmitter for up-converting and amplifying a transmitted signal, and a RF receiver for down-converting a frequency of a received signal. However, according to another embodiment, the transceiver 1520 may be implemented by more or less components.

The transceiver 1520 may be connected to the processor 1510 and transmit and/or receive a signal. The signal may include control information and data. In addition, the transceiver 1520 may receive the signal through a wireless channel and output the signal to the processor 1510. The transceiver 1520 may transmit a signal output from the processor 1510 through the wireless channel or network.

The memory 1530 may store the control information or the data included in a signal obtained by the apparatus 1500 for receiving a speech signal. The memory 1530 may be connected to the processor 1510 and store at least one instruction or a protocol or a parameter for the proposed function, process, and/or method. The memory 2130 may include read-only memory (ROM) and/or random access memory (RAM) and/or hard disk and/or CD-ROM and/or DVD and/or other storage devices.

The output unit 1540 may be connected to the processor 1510 and output a speech signal. The speech signal may be a fused speech signal comprising the low frequency feature information of the received speech signal and the recovered high frequency feature information of the received speech signal.

The above described speech transmitting method and device and speech receiving method and device use the down-sampling method based on AI to replace the traditional down-sampling methods, and use the up-sampling method based on AI to replace the traditional BWE method based on deep learning, thereby enabling the receiving end to better recover the high frequency information so as to provide better visual and audio experiences for users. In addition, since a model of the down-sampling method based on AI adopted by the transmitting end and a model of the up-sampling method based on AI adopted by the receiving end may be jointly trained, a feature extracting portion in the up-sampling process based on AI of the receiving end may reuse a feature extracting portion in the down-sampling process based on AI of the transmitting end, then the up-sampling process based on AI of the receiving end and the down-sampling process based on AI of the transmitting end may use the same convolution operation to learn corresponding information of high frequency features and low frequency features, thereby helping improving performance.

In addition, the disclosure also provides a non-transitory computer readable storage medium storing a program, and the program, when executed by one or more processors, implements the above speech transmitting method and/or speech receiving method.

In addition, one aspect of the embodiment is to provide a computer including a computer readable storage medium storing a computer program, and the computer program, when executed by a computer, implements the above speech transmitting method and/or speech receiving method.

In accordance with an aspect of the embodiment is to provide an electronic device and a controlling method thereof, in which the electronic device includes a storage and a processor, the storage storing a computer program, and the processor for, while running the computer program, performing the described speech transmitting method and/or speech receiving method.

Various exemplary embodiments are described above. It should be understood that the above descriptions are only exemplary, and are not intended to limit the scope of the inventive concept. It should be understood that one of ordinary skill in the art may make modifications, substitutions and improvements to the embodiments provided above without departing from the scope and spirit of the inventive concept. Therefore, the protection scope of the inventive concept should be subject to the scope of the appended claims.

What is claimed is:

1. A method of transmitting speech signal, the method comprising:
    extracting low frequency feature information from an input speech signal by using a first feature extracting network, wherein the first feature extracting network comprises at least one first feature extracting module and at least one second feature extracting module arranged in a cascading manner, wherein each of the at least one first feature extracting module and the at least one second feature extracting module performs a multiscale convolution operation based on at least two convolution processing parameters, wherein the low frequency feature information extracted by the first feature extracting network comprises relevant information between high frequency features and low frequency features, and wherein each of the at least one first feature extracting module and the at least one second feature extracting module performs the multiscale convolution operation using one or more neural network models acquired by machine learning using high frequency features and low frequency features of speech, the one or more neural network being learned at high frequency sampling rates through convolution operations with different convolution kernel sizes covering different frequency resolutions;
    fusing one or more low frequency feature information output by the first feature extracting network by using a first feature fusing network, to obtain a speech signal corresponding to the low frequency feature information, wherein the multiscale convolution operations are performed by the first feature extracting network to extract each of the one or more low frequency feature information using distinct parameters of the at least two convolution processing parameters; and
    transmitting the speech signal corresponding to the low frequency feature information to a receiving end.

2. The method of claim 1, wherein the extracting of the low frequency feature information from the input speech signal by using the first feature extracting network comprises:
    extracting speech feature information of the input speech signal by using the at least one first feature extracting module; and
    obtaining the low frequency feature information according to the speech feature information by using the at least one second feature extracting module.

3. The method of claim 2, wherein the extracting the speech feature information of the input speech signal comprises performing feature extraction on input information respectively based on the at least two convolution processing parameters, and outputting the speech feature information.

4. The method of claim 3, wherein the at least two convolution processing parameters comprise at least two of:
    a first convolution processing parameter corresponding to a first receptive field between adjacent samples of the speech signal, a second convolution processing parameter corresponding to a second receptive field of one pitch length, or a third convolution processing parameter corresponding to a third receptive field of at least two pitch lengths.

5. The method of claim 3, wherein the at least two convolution processing parameters comprise a convolution kernel size corresponding to a convolution operation.

6. The method of claim 2, wherein the obtaining of the low frequency feature information according to the speech feature information by using the at least one second feature extracting module comprises down-sampling the speech feature information at one or more scales.

7. A method for receiving speech signal, the method comprising:
    receiving a first speech signal transmitted by a transmitting end;
    extracting low frequency feature information from the first speech signal and recovering high frequency feature information based on the low frequency feature information, by using a second feature extracting network, wherein the second feature extracting network comprises at least one seventh feature extracting module and at least one eighth feature extracting module arranged in a cascading manner, wherein each of the at least one seventh feature extracting module and the at least one eighth feature extracting module performs a multiscale convolution operation based on at least two convolution processing parameters, wherein the low frequency feature information comprises relevant information between high frequency features and low frequency features, and wherein each of the at least one seventh feature extracting module and the at least one eighth feature extracting module performs the multiscale convolution operation using one or more neural network models acquired by machine learning using high frequency features and low frequency features of speech, the one or more neural network being learned at high frequency sampling rates through convolution operations with different convolution kernel sizes covering different frequency resolutions;

fusing feature information comprising the high frequency feature information and the low frequency feature information output by the second feature extracting network, by using a second feature fusing network, to obtain a second speech signal corresponding to the feature information comprising the high frequency feature information and the low frequency feature information, wherein the multi scale convolution operations are performed by the second feature extracting network to extract one or more low frequency feature information using distinct parameters of the at least two convolution processing parameters; and outputting the second speech signal comprising the low frequency feature information and the high frequency feature information.

8. The method of claim 7, further comprising:

performing data replication on the first speech signal to expand data scale of the first speech signal before the extracting the low frequency feature information from the first speech signal and recovering the high frequency feature information by using the second feature extracting network.

9. The method of claim 7, wherein the extracting of the low frequency feature information from the first speech signal and the recovering of the high frequency feature information by using the second feature extracting network comprises:

extracting the low frequency feature information from the first speech signal by using a low frequency feature extracting network in the second feature extracting network; and recovering the high frequency feature information according to the low frequency feature information and performing fusing processing on the high frequency feature information and the low frequency feature information, by using a high frequency feature extracting network in the second feature extracting network, to obtain the feature information comprising the high frequency feature information and the low frequency feature information.

10. The method of claim 9, wherein the low frequency feature extracting network comprises at least one third feature extracting module and at least one fourth feature extracting module, wherein the extracting the low frequency feature information from the first speech signal by using the low frequency feature extracting network in the second feature extracting network comprises: extracting speech feature information of the first speech signal by using the at least one third feature extracting module; and obtaining the low frequency feature information according to the speech feature information by using the at least one fourth feature extracting module, wherein the high frequency feature extracting network comprises at least one fifth feature extracting module and at least one sixth feature extracting module, wherein the recovering of the high frequency feature information according to the low frequency feature information and performing the fusing processing on the high frequency feature information and the low frequency feature information comprises:

recovering the high frequency feature information according to the low frequency feature information by using the at least one fifth feature extracting module; and performing fusing processing on the high frequency feature information and the low frequency feature information extracted by a corresponding fourth feature extracting module, by using the at least one sixth feature extracting module, to obtain the feature information comprising the high frequency feature information and the low frequency feature information.

11. The method of claim 10, wherein at least one of a plurality of feature extracting modules in the second feature extracting network performs feature extraction on input information respectively through the at least two convolution processing parameters, and outputs the speech feature information; and for the input information respectively corresponding to the at least two convolution processing parameters, the at least one sixth feature extracting module respectively performs fusing processing on the high frequency feature information and the low frequency feature information, which is extracted by the corresponding fourth feature extracting module according to corresponding convolution processing parameters, and outputs the feature information comprising the high frequency feature information and the low frequency feature information.

12. The method of claim 11, wherein the at least two convolution processing parameters comprise a convolution kernel size corresponding to a convolution operation.

13. The method of claim 7, wherein the extracting the low frequency feature information from the first speech signal and recovering the high frequency feature information by using the second feature extracting network comprises:

extracting speech feature information of the first speech signal by using the at least one seventh feature extracting module; and extracting the low frequency feature information comprising the relevant information between the high frequency features and the low frequency features according to the speech feature information and recovering the high frequency feature information, by using the at least one eighth feature extracting module, to obtain the feature information comprising the high frequency feature information and the low frequency feature information.

14. The method of claim 13, wherein the at least one seventh feature extracting module performs feature extraction on input information respectively through the at least two convolution processing parameters, and outputs the speech feature information; and the at least one eighth feature extracting module extracts the low frequency feature information from the input information respectively through at least two deconvolution processing parameters and recovers the high frequency feature information to obtain the feature information comprising the high frequency feature information and the low frequency feature information.

15. An apparatus for transmitting a speech signal, the apparatus comprising:

a transceiver;

at least one memory storing one or more instructions; and at least one processor executing the one or more instructions and configured to:

extract low frequency feature information from an input speech by using a first feature extracting network, wherein the first feature extracting network comprises at least one first feature extracting module and at least one second feature extracting module arranged in a cascading manner, wherein each of the at least one first feature extracting module and the at least one second feature extracting module performs a multiscale convolution operation based on at least two convolution processing parameters, wherein the low frequency feature information extracted by the first feature extracting network comprises relevant information between high frequency features and low frequency features, and wherein each of the at least one first feature extracting module and the at least one second feature extracting module performs the multiscale convolution operation using one or more neural network models acquired by machine learning using high frequency features and low frequency features of speech, the one or more neural network being learned at high frequency sampling rates through convolution operations with different convolution kernel sizes covering different frequency resolutions;

fusing one or more low frequency feature information output by the first feature extracting network by using a first feature fusing network, to obtain a speech signal corresponding to the low frequency feature information, wherein the multiscale convolution operations are performed by the first feature extracting network to extract each of the one or more low frequency feature information using distinct parameters of the at least two convolution processing parameters; and controlling the transceiver to transmit the speech signal corresponding to the low frequency feature information to a receiving end.

16. A non-transitory computer-readable recording medium having recorded thereon computer programs for performing a method of claim 1.

* * * * *